US012688079B2

(12) United States Patent　　(10) Patent No.: US 12,688,079 B2

Coles et al.　　(45) Date of Patent: Jul. 21, 2026

(54) SYSTEMS AND METHODS FOR VENDOR ALERTS FROM ANALYZED THIRD PARTY SOURCES

(71) Applicant: Wells Fargo Bank, N.A., San Francisco, CA (US)

(72) Inventors: Nathan B. Coles, San Francisco, CA (US); Tejal Shalinkumar Trivedi, San Francisco, CA (US); Luke Nelson deNatale, San Francisco, CA (US); Matthew Dennison, San Francisco, CA (US); Mattie L. Morris, Chandler, AZ (US); Brenda L. Gordon, San Francisco, CA (US); Kimberly Summerrow, San Francisco, CA (US); Trisha Leann Mitchell, San Francisco, CA (US); Qin Dong, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 433 days.

(21) Appl. No.: 18/346,147

(22) Filed: Jun. 30, 2023

(65) Prior Publication Data

US 2025/0004864 A1　　Jan. 2, 2025

(51) Int. Cl.
*G06F 9/54*　　(2006.01)
(52) U.S. Cl.
CPC .................................. *G06F 9/542* (2013.01)
(58) Field of Classification Search
CPC ....................................................... G06F 9/542

USPC .......................................................... 719/318
See application file for complete search history.

(56) References Cited

U.S. PATENT DOCUMENTS

| | | | |
|---|---|---|---|
| 2003/0033179 A1 | 2/2003 | Katz et al. | |
| 2007/0255604 A1* | 11/2007 | Seelig .............. | G06Q 10/06316 |
| | | | 705/7.26 |
| 2009/0285456 A1* | 11/2009 | Moon .................. | G06V 40/176 |
| | | | 382/118 |
| 2010/0138037 A1* | 6/2010 | Adelberg ................ | G07F 9/001 |
| | | | 700/241 |
| 2010/0251242 A1* | 9/2010 | Sivasubramanian ........................ | |
| | | | G06F 11/3006 |
| | | | 718/100 |
| 2013/0262203 A1* | 10/2013 | Frederick ........... | G06Q 30/0209 |
| | | | 705/14.58 |
| 2014/0146648 A1* | 5/2014 | Alber ................... | G11B 27/105 |
| | | | 369/53.1 |
| 2014/0278730 A1 | 9/2014 | Muhart et al. | |
| 2016/0366249 A1* | 12/2016 | Franco .................... | H04L 67/14 |
| 2017/0111508 A1* | 4/2017 | Sharpe .............. | G06Q 30/0261 |

(Continued)

*Primary Examiner* — Tuan C Dao

(74) *Attorney, Agent, or Firm* — Foley & Lardner LLP

(57) ABSTRACT

Systems and methods include establishing, by one or more processors of a first computing system, a connection between the first computing system and an application hosted on one or more servers of a second computing system, retrieving, by the one or more processors, a dataset comprising a list of entities from a data store maintained by the application, the list of entities associated with an account holder of an account with the application, detecting, by the one or more processors, an event associated with an entity of the list of entities, based on data from a third-party server, and generating, by the one or more processors, an alert corresponding to the event for rendering at a user interface corresponding to the first computing system.

20 Claims, 12 Drawing Sheets

1000 ➔

Establish A Connection Between A First Computing System And An Application Hosted On A Second Computing System 1010

↓

Retrieve A Dataset Including A List Of Entities Via The Connection From The Application 1020

↓

Detect An Event Associated With An Entity Of The List Of Entities Based On Third Party Data 1030

↓

Generate An Alert Corresponding To The Event For Rendering At A User Interface Corresponding With The First Computing System 1040

(56)        References Cited

U.S. PATENT DOCUMENTS

| | | | |
|---|---|---|---|
| 2017/0359409 A1* | 12/2017 | McWilliams | G06F 9/542 |
| 2018/0013818 A1* | 1/2018 | Howard | H04L 67/535 |
| 2018/0300916 A1* | 10/2018 | Barnett | G06Q 10/10 |
| 2020/0272432 A1* | 8/2020 | Shaikh | G06F 8/436 |
| 2020/0334727 A1* | 10/2020 | Ketchel, III | G06Q 50/22 |
| 2021/0158423 A1* | 5/2021 | Ngo | G06Q 30/0641 |
| 2021/0285321 A1* | 9/2021 | Verma | E21B 44/00 |
| 2023/0061605 A1* | 3/2023 | Ryan | G06Q 20/4016 |

* cited by examiner

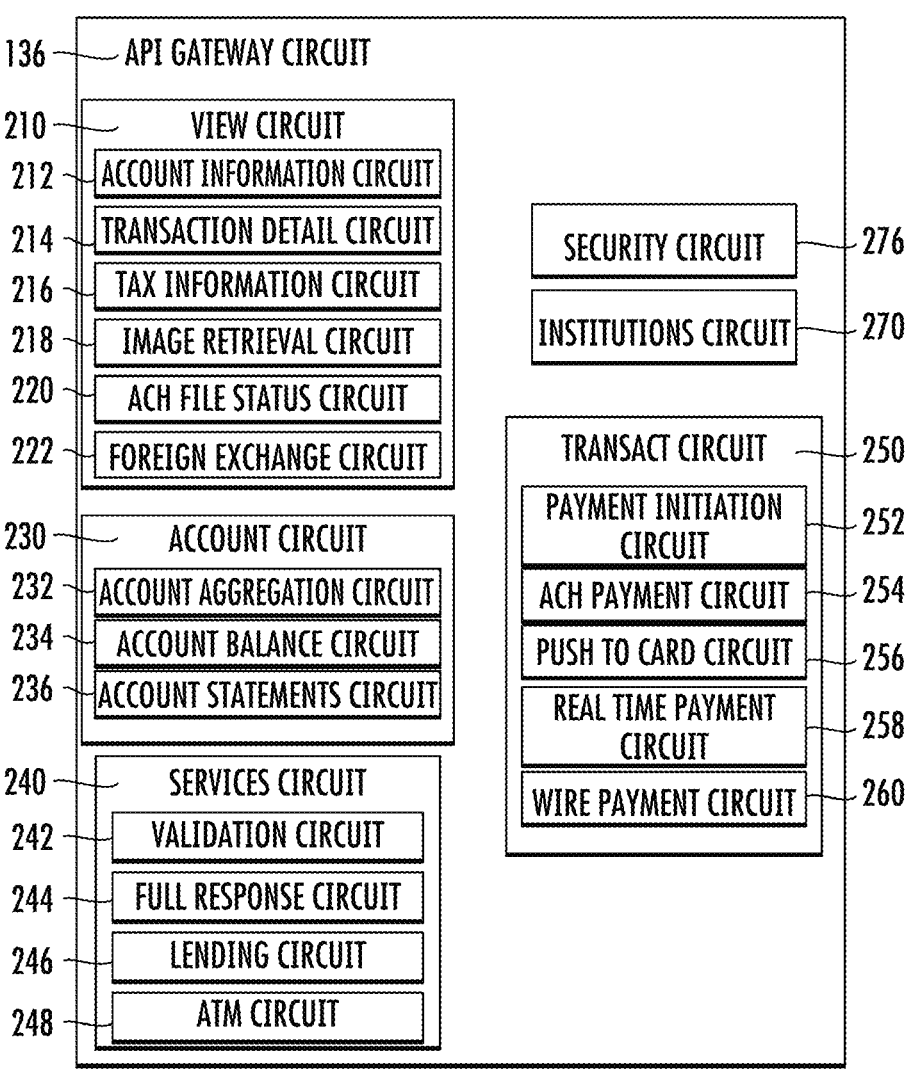

136 — API GATEWAY CIRCUIT

210 — VIEW CIRCUIT
212 — ACCOUNT INFORMATION CIRCUIT
214 — TRANSACTION DETAIL CIRCUIT
216 — TAX INFORMATION CIRCUIT
218 — IMAGE RETRIEVAL CIRCUIT
220 — ACH FILE STATUS CIRCUIT
222 — FOREIGN EXCHANGE CIRCUIT

230 — ACCOUNT CIRCUIT
232 — ACCOUNT AGGREGATION CIRCUIT
234 — ACCOUNT BALANCE CIRCUIT
236 — ACCOUNT STATEMENTS CIRCUIT

240 — SERVICES CIRCUIT
242 — VALIDATION CIRCUIT
244 — FULL RESPONSE CIRCUIT
246 — LENDING CIRCUIT
248 — ATM CIRCUIT

SECURITY CIRCUIT — 276
INSTITUTIONS CIRCUIT — 270

TRANSACT CIRCUIT — 250
PAYMENT INITIATION CIRCUIT — 252
ACH PAYMENT CIRCUIT — 254
PUSH TO CARD CIRCUIT — 256
REAL TIME PAYMENT CIRCUIT — 258
WIRE PAYMENT CIRCUIT — 260

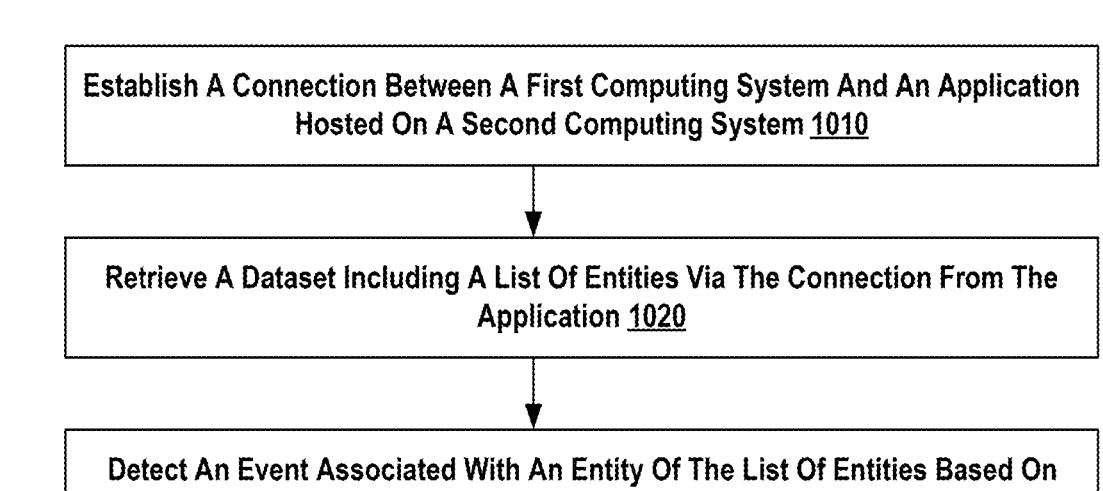

Establish A Connection Between A First Computing System And An Application Hosted On A Second Computing System 1010

Retrieve A Dataset Including A List Of Entities Via The Connection From The Application 1020

Detect An Event Associated With An Entity Of The List Of Entities Based On Third Party Data 1030

Generate An Alert Corresponding To The Event For Rendering At A User Interface Corresponding With The First Computing System 1040

FIG. 10

SYSTEMS AND METHODS FOR VENDOR ALERTS FROM ANALYZED THIRD PARTY SOURCES

TECHNICAL FIELD

The present disclosure relates to systems and methods for providing alerts based on analyzed third party sources. More specifically, the present disclosure relates to systems and method of determining a list or relevant entities based on resource data, detecting an event associated with an entity from the list of entities, and generating an alert corresponding with the event.

BACKGROUND

Businesses often use various software platforms to manage their business processes, interactions with customers, and overall day-to-day operations. For example, businesses often use an enterprise resource planning (ERP) platform to manage main business processes (e.g., finance, human resources, etc.), a customer relationship management (CRM) platform to manage the business's interactions with existing and potential customers, and third-party platforms for other day-to-day operations (e.g. financial, banking, etc.).

SUMMARY

Systems, methods, and computer-readable media for generating an alert includes establishing, by one or more processors of a first computing system, a connection between the first computing system and an application hosted on one or more servers of a second computing system, retrieving, by the one or more processors, a dataset comprising a list of entities from a data store maintained by the application, the list of entities associated with an account holder of an account with the application, detecting, by the one or more processors, an event associated with an entity of the list of entities, based on data from a third-party server, and generating, by the one or more processors, an alert corresponding to the event for rendering at a user interface corresponding to the first computing system.

According to various embodiments, detecting the event includes receiving, by the one or more processors, the data from the third-party server, applying, by the one or more processors, the data to a machine learning model trained to normalize the data, to determine normalized data from the data, and detecting, by the one or more processors, the event based on the normalized data from the machine learning model. The machine learning model may be a first machine learning model, and the method may further include applying, by the one or more processors, the event to a second machine learning model trained to generate recommendations given one or more events as an input, and determining, by the one or more processors, a recommendation for the event associated with the entity based on an output from the second machine learning model. The alert may include the recommendation determined for the event. The third-party server may include a first third-party server, and wherein detecting the event based on the normalized data from the machine learning model includes scraping, by the one or more processors, the data from the first third-party server to identify one or more identifiers of the entity included in the data, generating, by the one or more processors, a query for a second third-party server using the one or more identifiers, and verifying, by the one or more processors, the entity identified in the data from the first third-party server as matching the entity in the list of entities in the dataset base on a response to the query from the second third-party server. Generating the alert may be responsive to verifying the entity as matching the entity in the list of entities.

The method may include computing, by the one or more processors, a first score for the event and a second score for matching the entity identified in the data to the entity in the list of entities in the dataset, wherein the alert is generated responsive to the first score and the second score satisfying a threshold criteria. The detecting the event may include receiving, by one or more processors, content from a third party server including one or more identifiers of the entity and metrics corresponding to the event, normalizing, by the one or more processors, the one or more metrics, determining, b the one or more processors, that the normalized one or more metrics satisfy a criterion for identifying the presence of the event, computing, by the one or more processors, a match score based on the one or more identifiers being associated with the entity from the list of entities included in the dataset, and detecting, by the one or more processors, the event associated with the entity responsive to the match score satisfying a threshold criteria and the normalized one or more metrics satisfying the criterion. Generating the alert may include applying, by the one or more processors, data corresponding to the event and one or more values from fields retrieved from an account with the second computing system to a machine learning model trained to generate recommendations for corresponding events, and generating, by the one or more processors, the alert to include a recommendation corresponding to an alternative entity with respect to the entity.

According to another example embodiment, a system includes one or more processors configured to establish a connection between a first computing system and an application hosted on one or more servers of a second computing system, retrieve a dataset comprising a list of entities from a data store maintained by the application, the list of entities associated with an account holder of an account with the application, detect an event associated with an entity of the list of entities, based on data from a third-party server, and generate an alert corresponding to the event for rendering at a user interface corresponding to the first computing system.

According to various embodiments, to detect the event, the one or more processors are configured to receive the data from the third-party server, apply the data to a machine learning model trained to normalize the data, to determine normalized data from the data, and detect the event based on the normalized data from the machine learning model. The machine learning model may be a first machine learning model, wherein the one or more processors are configured to apply the event to a second machine learning model trained to generate recommendations given one or more events as an input and determine a recommendation for the event associated with the entity based on an output from the second machine learning model. The alert may include the recommendation determined for the event. The third-party server may include a first third-party server, and wherein detecting the event based on the normalized data from the machine learning model includes scraping, by the one or more processors, the data from the first third-party server to identify one or more identifiers of the entity included in the data, generating, by the one or more processors, a query for a second third-party server using the one or more identifiers, and verifying, by the one or more processors, the entity identified in the data from the first third-party server as matching the entity in the list of entities in the dataset base on a response to the query from the second third-party server. The one or more processors may generate the alert responsive to verifying the entity as matching the entity in the list of entities. The one or more processors may be configured to compute a first score for the event and a second score for matching the entity identified in the data to the entity in the list of entities in the dataset, wherein the alert is generated responsive to the first score and the second score satisfying a threshold criteria. To detect the event, the one or more processors may be configured to receive content from a third party server including one or more identifiers of the entity and metrics corresponding to the event, normalize the one or more metrics, determine that the normalized one or more metrics satisfy a criterion for identifying the presence of the event, compute a match score based on the one or more identifiers being associated with the entity from the list of entities included in the dataset, and detect the event associated with the entity responsive to the match score satisfying a threshold criteria and the normalized one or more metrics satisfying the criterion. To generate the alert, the one or more processors are configured to apply data corresponding to the event and one or more values from fields retrieved from an account with the second computing system to a machine learning model trained to generate recommendations for corresponding events and generate the alert to include a recommendation corresponding to an alternative entity with respect to the entity.

According to another example embodiment, a non-transitory computer readable medium storing instructions that, when executed by one or more processors, cause the one or more processors to establish a connection between a first computing system and an application hosted on one or more servers of a second computing system, retrieve a dataset comprising a list of entities from a data store maintained by the application, the list of entities associated with an account holder of an account with the application, detect an event associated with an entity of the list of entities, based on data from a third-party server, and generate an alert corresponding to the event for rendering at a user interface corresponding to the first computing system.

According to various embodiments, to detect the event, the instructions cause the one or more processors to receive content from a third party server including one or more identifiers of the entity and metrics corresponding to the event, normalize the one or more metrics, determine that the normalized one or more metrics satisfy a criterion for identifying the presence of the event, compute a match score based on the one or more identifiers being associated with the entity from the list of entities included in the dataset, and detect the event associated with the entity responsive to the match score satisfying a threshold criteria and the normalized one or more metrics satisfying the criterion.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

Before turning to the Figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIG. 2 is a schematic diagram of an application programming interface (API) gateway circuit of the computing system of FIG. 1, according to an exemplary embodiment.

FIG. 10 is a flowchart showing a method for generating an alert for rendering at a user interface is shown, according to an example embodiment.

DETAILED DESCRIPTION

Figure 1:
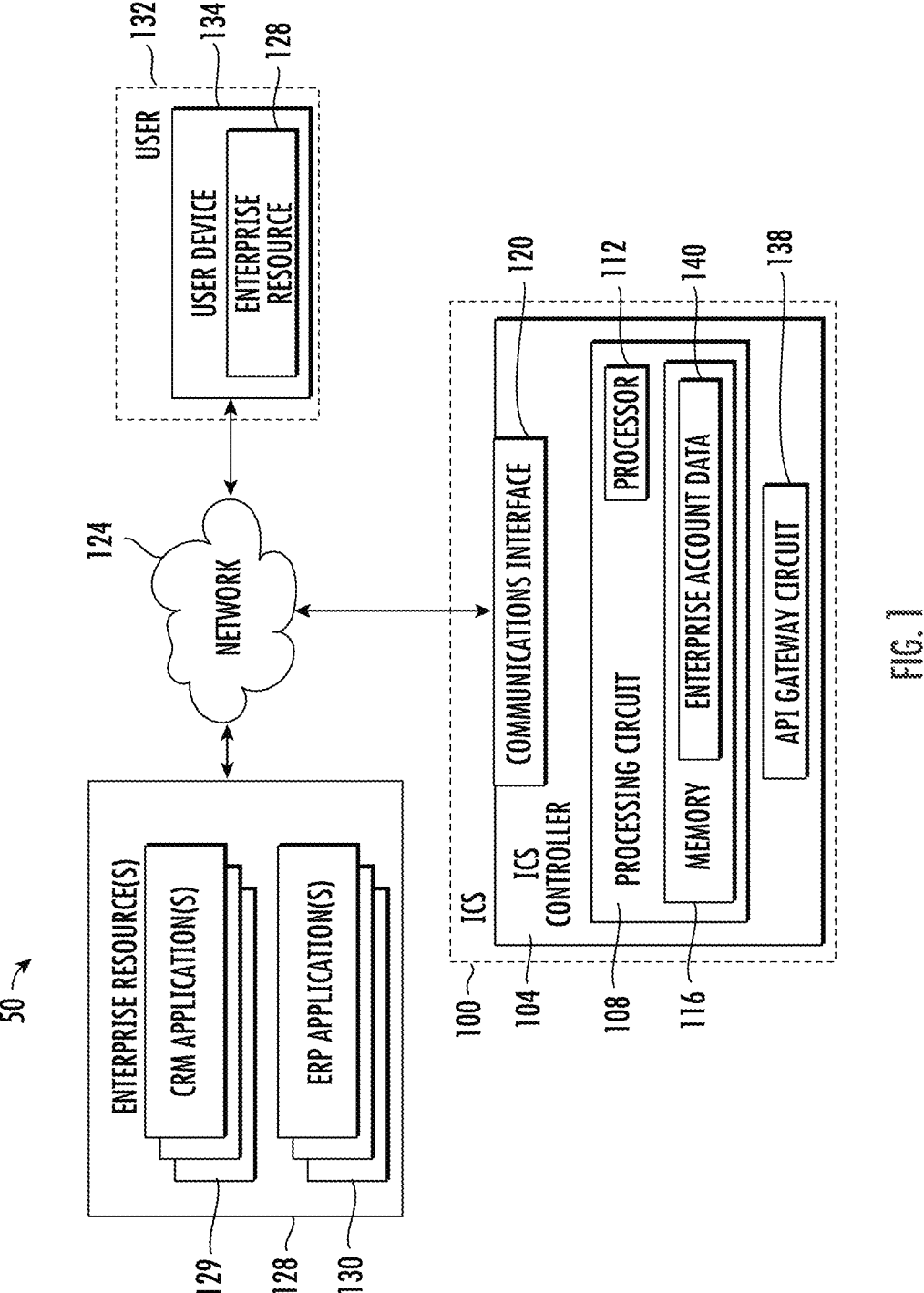
FIG. 1 is a schematic diagram of a computing system, according to an exemplary embodiment.

Following below are more detailed descriptions of various concepts related to, and implementations of, systems and methods for delivering content (such as alerts or other notifications relating to a customer or enterprise) using data from an enterprise resource, such as an enterprise resource planning (ERP) application or customer relationship management (CRM) application. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

In various implementations, an enterprise may maintain various applications and resources which are used in day-to-day operations. For example, an enterprise may maintain, use, or otherwise access various enterprise resources. Such resources may be or include customer relationship management (CRM) applications (e.g., for establishing leads on new customers, assisting in converting a lead to a sale, planning delivery, and so forth), enterprise resource planning (ERP) applications, such as human resources (HR) or payroll applications, marketing applications, customer service applications, operations/project/supply chain management applications, commerce design applications, and the like. Each of these applications may be maintained as part of suite or platform of applications which are accessible by various users associated with the enterprise. The enterprise resources may be locally-hosted applications or resources (e.g., executing on various computing devices of the enterprise), or cloud-hosted or web-based applications or resources provisioned to the enterprise computing devices and systems by one or more third parties. For example, the enterprise resources may be or include a software suite or platform including a plurality of enterprise resources which are accessible by enterprise computing devices or systems. Each of these platforms, applications, resources, etc. may store, maintain, or otherwise include various data which provides information relating to the enterprise.

Such enterprise resources may be limited in their capabilities to interface with, exchange data with, or otherwise interoperate with other applications or resources of an enterprise. For example, an ERP application (or CRM application) may not be configured to exchange, transmit, receive, or otherwise access data associated with financial accounts associated with the enterprise. As such, enterprise members (or enterprise users) may be required to access multiple applications (e.g., several ERP applications, CRM applications, financial institution applications, etc.) in performing day-to-day operations for the enterprise. Such implementations result in bogged-down user experiences, decreased efficiency, and so forth.

According to an exemplary embodiment, one or more computing systems may be configured to generate, maintain, or otherwise establish a connection between the enterprise resource(s) and an institution computing system (ICS). The computing system may be configured to retrieve a dataset including data indicative of the enterprise (e.g., a list of entities, such as vendors, suppliers, customers, etc.). The computing system may detect an event associated with an entity based on data from a third-party server. The event may be, for example, a news event, an earnings announcement, a bankruptcy, etc. The computing system may generate an alert for the enterprise according to the detected event.

According to the systems and methods described herein, the computing system may be configured to provide predictive event-based alerts. The computing system may be configured to use machine-learning to determine a matching score between a named entity in the event and an entity associated with the enterprise. Such implementations may provide for a reduced likelihood of misinformation or wrongfully identifying an event for an entity. The computing system may be configured to use various models for providing predictions of positive or negative impacts of the event. Such implementations may provide for more robust alerts through added context (using real-time data of the event as well as the enterprise's enterprise resource data). Additional advantages and improvements are described in greater detail below.

For purposes of reading the description of the various embodiments below, the following enumeration of sections of the specification of their respective contents are provided:
Section I: Integrating Enterprise Resource and Institution Computing System; Section II: Machine Learning Model(s); Section III: Systems and Methods for Generating Vendor Alerts From Analyzed Third Party Sources.
Section I: Integrating Enterprise Resource and Institution Computing System Referring now to FIG. 1, a schematic diagram of a computing system 50 is shown, according to an exemplary embodiment. Computing system 50 is shown to include an institution computing system (ICS) 100, which includes an ICS controller 104. The ICS controller 104 includes a processing circuit 108, having a processor 112 and a memory 116. The ICS controller 104 may also include, and the processing circuit 108 may be communicably coupled to, a communications interface 120 such that the processing circuit 108 may send and receive content and data via the communications interface 120. As such, the ICS controller 104 may be structured to communicate via one or more networks 124 with other devices and/or applications. The computing system 50 is shown to include enterprise resources 128 including a plurality of CRM applications 129 and a plurality of ERP applications 130, and a user device 134 accessing an enterprise resource 128 (which may be one of the enterprise resources 128). In some embodiments, the ICS controller 104, the enterprise resources 128, and the user device 134 may be communicably coupled and configured to exchange data over the network 124, which may include one or more of the Internet, cellular network, Wi-Fi, Wi-Max, a proprietary banking network, a proprietary retail or service provider network, or other type of wired or wireless network. The ICS controller 104 may be configured to transmit, receive, exchange, or otherwise provide data to one or more of the enterprise resources 128. The ICS controller 104 is shown to include an application programming interface (API) gateway circuit 138. The API gateway circuit 138 may be configured to facilitate the transmission, receipt, and/or exchange of data between the ICS controller 104 and the enterprise resources 128.

Referring to FIG. 1 generally, the ICS controller 104 is associated with (e.g., owned, managed, and/or operated by) the institution computing system (ICS) 100. In the example depicted, the ICS 100 is a computing system configured to maintain data or content relating to one or more one or more enterprises (e.g., enterprise account data 140). According to the embodiments described herein, the ICS 100 may be configured to transmit existing enterprise account data 140 to one or more enterprise resources 128. For example, the ICS 100 may be configured to provide various content and data relating to different institution accounts, such as general ledger accounts, lending, money transfers, issuing credit or debit, etc. Thus, the ICS controller 104 is structured or configured to maintain and provide, or otherwise facilitate providing, the content and data (e.g., the enterprise account data 140) to devices and/or applications associated with internal or external users (e.g., users having an account with the institution corresponding to the ICS 100, users seeking to establish an account with the institution, etc.). In some embodiments, the ICS controller 104 is structured or configured control access to the enterprise account data 140 (e.g., by authenticating an enterprise resource 128 or a user of the enterprise resource 128).

In some embodiments, the ICS controller 104 may be implemented within a single computer (e.g., one server, one housing, etc.). In other embodiments, the ICS controller 104 may be distributed across multiple servers or computers, such as a group of two or more computing devices/servers, a distributed computing network, a cloud computing network, and/or any other type of computing system capable of accessing and communicating via local and/or global networks (e.g., the network 124). Further, while FIG. 1 shows applications outside of the ICS controller 104 (e.g., the network 124, the enterprise resources 128, etc.), in some embodiments, one or more of the enterprise resources 128 may be hosted within the ICS controller 104 (e.g., within the memory 116).

As shown in FIG. 1, the ICS controller 104 is shown to include the processing circuit 108, including the processor 112 and the memory 116. The processing circuit 108 may be structured or configured to execute or implement the instructions, commands, and/or control processes described herein with respect to the processor 112 and/or the memory 116. FIG. 1 shows a configuration that represents an arrangement where the processor 112 is embodied in a machine or computer readable media, as described below. However, FIG. 1 is not meant to be limiting as the present disclosure contemplates other embodiments, such as where the processor 112, or at least one circuit of processing circuit 108 (or ICS controller 104), is configured as a hardware unit. All such combinations and variations are intended to fall within the scope of the present disclosure.

The processing circuit 108 is shown to include the processor 112. The processor 112 may be implemented or performed with a general purpose single- or multi-chip processor, a digital signal processor (DSP), an application specific integrated circuit (ASIC), one or more field programmable gate array (FPGAs), or other suitable electronic processing components. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the circuits of the processor 112 may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The processing circuit 108 is also shown to include the memory 116. The memory 116 (e.g., memory, memory unit, storage device, etc.) may include one or more devices (e.g., RAM, ROM, Flash memory, hard disk storage, etc.) for storing data and/or computer code for completing or facilitating the processes, layers, and modules described in the present application. The memory 116 may be or include tangible, non-transient volatile memory or non-volatile memory. The memory 116 may also include database components, object code components, script components, or any other type of information structure for supporting the activities and information structures described in the present application. According to an exemplary embodiment, the memory 116 is communicably connected to the processor 112 via the processing circuit 108 and includes computer code for executing (e.g., by the processing circuit 108 and/or the processor 112) one or more processes described herein.

As shown in FIG. 1, the ICS controller 104 is also shown to include an application programming interface (API) gateway circuit 138. In some embodiments, the external devices (e.g., CRM application(s) 129 or ERP application(s) 130 of the enterprise resources 128, user device 134 having enterprise resource 128, etc.) may include API protocols that are used to establish an API session between the ICS controller 104 and the external devices. In this regard, the API protocols and/or sessions may allow the ICS 100 to communicate content and data (e.g., associated with the institution's products and/or services) to be displayed directly within the external devices (e.g., CRM application(s) 129, ERP application(s) 130, user device 134, etc.). For example, the external device may activate an API protocol (e.g., via an API call), which may be communicated to the ICS controller 104 via the network 124 and the communications interface 120. The API gateway circuit 138 may receive the API call from the ICS controller 104, and the API gateway circuit 138 may process and respond to the API call by providing API response data. The API response data may be communicated to the external device via the ICS controller 104, communications interface 120 and the network 124. The external device may then access (e.g., display) the API response data (e.g., associated with the ICS 100 product and/or service) on the external device.

As such, the API gateway circuit 138 is structured to initiate, receive, process, and/or respond to API calls (e.g., via the ICS controller 104 and the communications interface 120) over the network 124. That is, the API gateway circuit 138 may be configured to facilitate the communication and exchange of content and data between the external devices (e.g., CRM applications 129, ERP applications 130, user device 134, etc.) and the ICS controller 104. Accordingly, to process various API calls, the API gateway circuit 138 may receive, process, and respond to API calls using other circuits, as discussed below. Additionally, the API gateway circuit 138 may be structured to receive communications (e.g., API calls, API response data, etc.) from other circuits. That is, other circuits may communicate content and data to the ICS controller 104 via the API gateway circuit 138. Therefore, the API gateway circuit 138 is communicatively coupled other circuits of the ICS controller 104, either tangibly via hardware, or indirectly via software.

Still referring to FIG. 1, the computing system 50 may further include a plurality of enterprise resources 128. The enterprise resources 128 may be or include various systems or applications which are provided to an enterprise (e.g., by one or more service providers of the enterprise resource(s) 128). The enterprise resources 128 may be configured to facilitate management of resources corresponding to various entities in various industries. The enterprise resources 128 is shown to include a plurality of customer relationship management (CRM) applications 129. The CRM applications 129 may be or include applications for establishing leads on new customers, assisting in converting a lead to a sale, planning delivery, and so forth. The enterprise resources 128 is shown to include a plurality of ERP applications 130. The ERP applications 130 may include human resources (HR) or payroll applications, marketing applications, customer service applications, operations/project/supply chain management applications, commerce design applications, and the like.

The enterprise resources 128 may be implemented on or otherwise hosted on a computing system, such as a discrete server, a group of two or more computing devices/servers, a distributed computing network, a cloud computing network, and/or another type of computing system capable of accessing and communicating using local and/or global networks (e.g., the network 124). Such computing system hosting the enterprise resources 128 may be maintained by a service provider corresponding to the enterprise resource(s) 128. The enterprise resources 128 may be accessible by various computing devices or user devices associated with an enterprise responsive to enrollment of the enterprise with the enterprise resources 128. The CRM applications 129 and/or the ERP applications 130 may include software and/or hardware capable of implementing a network-based or web-based applications (e.g., closed-source and/or open-source software like HTML, XML, WML, SGML, PHP, CGI, Dexterity, TypeScript, Node, etc.). Such software and/or hardware may be updated, revised, or otherwise maintained by resource or service providers of the enterprise resources 128. The CRM and ERP application(s) 129, 130 may be accessible by a representative(s) of a small or large business entity, any customer of the institution, and/or any registered (or unregistered) user of the products and/or service provided by one or more components of the computing system 50. As such, the enterprise resources 128 (including the CRM application(s) 129 and/or the ERP application(s) 130) may be or include a platform (or software suite) provided by one or more service providers which is accessible by an enterprise having an existing account with the ICS 100. In some instances, the enterprise resources 128 may be accessible by an enterprise which does not have an existing account with the ICS 100, but may open or otherwise establish an account with the ICS 100 using a CRM application 129 and/or an ERP application 130 of the enterprise resources 128, as described in greater detail below.

The enterprise resources 128 may be configured to establish connections with other systems in the computing system 50 (e.g., the ICS 100, the user device 134, etc.) via the network 124. Accordingly, the CRM application(s) 129 and/or ERP application(s) 130 of the enterprise resources 128 may be configured to transmit and/or receive content and data to and/or from the ICS controller 104 (e.g., via the communications interface 120) over the network 124. For example, and as described in greater detail below, an ERP application 130 (or CRM application 129) may activate an API protocol (e.g., via an API call) associated with the ICS 100 (e.g., to open an account, to request or apply for a loan instrument, to verify or determine an account balance, etc.). The API call may be communicated to the ICS controller 104 via the network 124 and the communications interface 120. The ICS controller 104 (e.g., the API gateway circuit 138) may receive, process, and respond to the API call by providing API response data. The API response data may be communicated to the ERP application 130 (or CRM application 129) via the communications interface 120 and the network 124, and the ERP application 130 (or CRM application 129) may access (e.g., analyze, display, review, etc.) the content and data received from the ICS 100.

In an exemplary embodiment, the enterprise resources 128 may be configured to include an interface that displays the content and data communicated from the ICS controller 104. For example, the enterprise resources 128 may include a graphical user interface, a mobile user interface, or any other suitable interface that may display the content and data (e.g., associated with products and services of the ICS 100) to the enterprise resources 128. In this regard, enterprise resources 128, and entities associated with the enterprise resources 128 (e.g., customers, employees, shareholders, policy holders, etc.), may access, view, analyze, etc. the content and data transmitted by the ICS controller 104 remotely using the enterprise resources 128.

Still referring to FIG. 1, the computing system 50 may further include a user device 134 associated e.g., owned by, used by, etc. with a user 132. The user device 134 may be or include a mobile phone, a tablet, a laptop, a desktop computer, an IoT-enabled device (e.g., an IoT-enabled smart car), a wearable device, a virtual/augmented reality (VR/AR) device, and/or other suitable user computing devices capable of accessing and communicating using local and/or global networks (e.g., the network 124). Wearable computing devices may refer to types of devices that an individual wears, including, but not limited to, a watch (e.g., a smart watch), glasses (e.g., eye glasses, sunglasses, smart glasses, etc.), bracelet (e.g., a smart bracelet), etc. In an exemplary embodiment, the user 132 may be a customer or client of the ICS 100 associated with the ICS controller 104 (e.g., a user having access to one or more accounts of another entity, such as a business or enterprise, another individual, etc.).

The user device 134 may be configured to establish connections with other systems in the computing system 50 (e.g., ICS 100, enterprise resources 128, etc.) via the network 124. Accordingly, the user device 134 may be able to transmit and/or receive content and data to and/or from the ICS controller 104 (e.g., via the communications interface 120) over the network 124. In some embodiments, the user device 134 may be able to transmit and/or receive content and data to and/or from the enterprise resources 128 over the network 124. In an exemplary embodiment, the user device 134 may include software and/or hardware capable of accessing a network-based or web-based application. For example, in some instances, the user device 134 may include an application that includes (closed-source and/or open-source) software such as HTML, XML, WML, SGML, PHP (Hypertext Preprocessor), CGI, Dexterity, TypeScript, Node, etc.

As shown in FIG. 1, the user device 134 is also shown to access an enterprise resource 128, which may be or include one or more of the enterprise resources 128 described above (e.g., a CRM application 129, an ERP application 130). For example, a user of the enterprise resource 128 may provide log-in credentials associated with an enterprise, to access the corresponding enterprise resource 128. In some embodiments, the enterprise resource 128 may be a standalone application. In some embodiments, the enterprise resource 128 may be incorporated into one or more existing applications of the user device 134. The enterprise resource 128 may be downloaded by the user device 134 prior to its usage, hard coded in the user device 134, and/or be a network-based or web-based interface application. In this regard, the ICS controller 104 may provide content and data (e.g., relating to the ICS 100 products or services) to the enterprise resource 128 via the network 124, for displaying at the user device 134. The enterprise resource 128 may receive the content and data (e.g., directly from the ICS controller 104, or indirectly from the ICS controller 104), and the user device 134 may process and display the content and data remotely to the user through the enterprise resource 128 displayed at the user device 134.

In some embodiments, the user device 134 may prompt the user 132 to log onto or access a web-based interface before using the enterprise resource 128. Further, prior to use of the enterprise resource 128, and/or at various points throughout the use of the enterprise resource 128, the user device 134 may prompt the user 132 to provide various authentication information or log-in credentials (e.g., password, a personal identification number (PIN), a fingerprint scan, a retinal scan, a voice sample, a face scan, any other type of biometric security scan) to ensure that the user 132 associated with the user device 134 is authorized to use the enterprise resource 128 and/or access the data from the ICS corresponding to the enterprise.

In an exemplary embodiment, the enterprise resource 128 is structured to provide displays on the user device 134, which provide content and data corresponding to the enterprise resource 128 to the user 132. As described in greater detail below, the enterprise resource 128 may be configured to display, render, or otherwise provide data from the ICS 100 (such as enterprise account data 140) to the user 132 via the user device 134. As such, the user device 134 may permit the user 132 to access the content and data of the ICS 100 that is maintained and distributed by the ICS controller 104 using the enterprise resource 128 (e.g., via the communications interface 120 and the network 124).

In an exemplary embodiment, an enterprise resource 128 accessed via the user device 134 may be configured to transmit, send, receive, communicate, or otherwise exchange data with the ICS 100. For example, an ERP application 130 (e.g., or CRM application 129) may have an option for viewing account information relating to accounts with the ICS 100. The user 132 of the user device 134 (e.g., a registered user having an account with the institution corresponding to the ICS 100) may select the option on the ERP application 130 to view the account information of the user 132 within the ERP application 130. The ERP application 130 may activate an API protocol (e.g., via an API call) to request the information from the ICS controller 104 corresponding to the account information. The ERP application 130 may communicate the API call to the ICS controller 104 via the network 124 and the communications interface 120. The ICS controller 104 (e.g., the API gateway circuit 138) may receive, process, and respond to the API call to provide API response data. For example, responsive to the ERP application 130 (or ICS controller 104) authenticating the user 132 as described above, the ERP application 130 may transmit data corresponding to the user (e.g., a user identifier) with the API call to the ICS controller 104. The ICS controller 104 may perform a look-up function in an accounts database using the user identifier from the API call to generate the API response data including the enterprise account data 140. The API response data may be communicated to the ERP application 130 via the communications interface and the network 124. In some embodiments, the ERP application 130 may display the response data to the user 132 (e.g., via the ERP application(s) 130), such as the enterprise account data 140.

Similarly, the user device 134 may communicate with the ICS 100, via the network 124, requesting enterprise resource 128 data (e.g., data from a CRM application 129, data from an ERP application 130, etc.) to view on a page associated with the ICS 100. For example, the user device 134 may display a page or user interface corresponding to the ICS 100 which includes an option for viewing analytics on conversion of leads to sales from the CRM application 129. The user device 134 may receive a selection of the option, and initiate a request for the ICS 100 to request the customer information from the CRM application 129. The ICS 100 (e.g., the ICS controller 104 via the communications interface 120) may process the request from the user device 134 (e.g., as discussed above), and activate an API protocol (e.g., via an API call) associated with the request (i.e., and the CRM application 129, etc.). The API call may be communicated to the CRM application 129 via the network. The CRM application 129 may receive, process, and respond to the API call by providing API response data as described above. The API response data may be communicated to the ICS 100 (e.g., the ICS controller 104 via the network and the communications interface 120). In some embodiments, a webpage or website (or application) associated with the ICS 100 may display the CRM data received from the CRM application 129 along with ICS data (e.g., account data, balances, etc.).

Referring to FIG. 2, a schematic diagram of the API gateway circuit 138 of FIG. 1 is shown, according to an exemplary embodiment. As shown in FIG. 2, the API gateway circuit 138 may include a plurality of circuits. As some examples, the API gateway circuit 138 may include a view circuit 210, an account circuit 230, a services circuit 240, a transact circuit 250, an institutions circuit 270, and a security circuit 276. Each of the plurality of circuits (e.g., circuits 210-276) may also include a plurality of sub-circuits, as discussed below.

Referring generally to FIG. 2, in an exemplary embodiment the plurality of circuits (e.g., circuits 210-276) of the API gateway circuit 138 are structured to initiate, receive, process, and/or respond to API calls. As discussed briefly with regard to FIG. 1, the enterprise resources 128 may be configured to have API protocols which are used to establish sessions and facilitate communications (or exchange of data) between the ICS controller 104 and the enterprise resources 128. As such, the circuits (e.g., circuits 210-276) may receive an API call from the enterprise resources 128 (e.g., the ERP applications 130, CRM applications 129, etc.) via the network 124, the communications interface 120, and the API gateway circuit 138. The circuits (e.g., circuits 210-276) may then process the API call, and transmit content and data in response (e.g., API response data). The API response data may include information corresponding to the API call and associated with the corresponding circuit of the ICS 100. The data (e.g., API response data) may be transmitted back to the enterprise resources 128 through the communications interface 120, and the network 124. In this regard, the API protocols and sessions may allow the enterprise resources 128 and the user device 134 to request, transmit, receive, and/or display information relating to the content corresponding to the ICS 100 (e.g., via the ICS controller 104). Various examples of general functions which may be performed by each of the circuits 210-276 provided in the API gateway circuit 138 are described in greater detail below.

As shown in FIG. 2, the view circuit 210 may include a plurality of circuits that are generally structured to retrieve and provide information. The view circuit 210 may include an account information circuit 212, a transaction detail circuit 214, a tax information circuit 216, an image retrieval circuit 218, an automated clearing house (ACH) file status circuit 220, and a foreign exchange circuit 222. In an exemplary embodiment, the account information circuit 212 may be structured to retrieve and provide account balance and transaction data for checking and/or saving accounts. The transaction detail circuit 214 may be structured to retrieve and provide same day or previous day data (e.g., details, summaries, etc.) for one or more accounts. The transaction detail circuit 214 may also be structured to retrieve and provide specific transaction data (e.g., wire payments, ACH payments, checks, deposits, etc.). The tax information circuit 216 may be structured to retrieve and provide historic tax information (e.g., documents) of entities having an account with the ICS 100. In some embodiments, the tax information circuit 216 may be structured to retrieve and provide tax data from the ICS 100 with certain criteria (e.g., trust accounts, brokerage accounts, mortgages, student loans, etc.).

Referring still to the view circuit 210, in an exemplary embodiment, the image retrieval circuit 218 may be structured to retrieve and provide images of certain checks and/or deposit slips (e.g., paid, deposited, returned, etc.). In some embodiments, the image retrieval circuit 218 may be structured to provide data (e.g., research, reconciliation, collection, adjustments, etc.) relating to accounts maintained at the ICS 100. In other embodiments, the image retrieval circuit 218 may be structured to retrieve and provide data relating to checks (e.g., paid checks, deposited checks, returned checks, etc.) over a predetermined period for accounts maintained at the ICS 100. The ACH file status circuit 220 may be structured to retrieve and/or provide the status of ACH files and ACH batches originated through the ICS 100.

The foreign exchange circuit 222 may be structured to retrieve and provide national and international exchange data (e.g., exchange rates) and certain ICS 100 account information (e.g., customer, supplier, payroll, marketplace, etc.).

As shown in FIG. 2, the account circuit 230 may also include a plurality of other circuits, which may be generally structured to retrieve and provide account specific information. For example, the account circuit 230 may include an account aggregation circuit 232, an account balance circuit 234, and an account statements circuit 236. In an exemplary embodiment, the account aggregation circuit 232 may be structured to retrieve and provide data relating to an ICS 100 account (e.g., checking, savings, credit, loan, investment, etc.). The account aggregation circuit 232 may also be structured to retrieve and provide historic and/or real-time account data (e.g., balances, transactions, holdings, etc.) of accounts maintained at the ICS 100.

Still referring to the account circuit 230, in an exemplary embodiment, the account balance circuit 234 may be structured to retrieve and provide balance information for national and/or international commercial accounts (e.g., checking, savings, general ledger, etc.). The account balance circuit 234 may also be structured to retrieve and provide additional balance information (e.g., opening balance, current available balance, closing ledger, etc.). The account statements circuit 236 may be structured to retrieve and provide certain ICS 100 account statements (e.g., accounts with certain credit cards, trust accounts, lines of credit, etc.) based on an input.

As shown in FIG. 2, the services circuit 240 may also include a plurality of other circuits that are generally configured to process and provide information. The services circuit 240 may include a validation circuit 242, a full response circuit 244, a lending circuit 246, and an automated teller machine (ATM) circuit 248. In an exemplary embodiment, the validation circuit 242 may be structured to process and provide status and ownership information for certain accounts maintained at the ICS 100. In some embodiments, the validation circuit 242 is structured to process certain new and/or existing ICS 100 accounts (e.g., enroll or establish new accounts, collect premiums on accounts, issue or collect taxes on accounts, etc.). The full response circuit 244 may be structured to provide detailed response information on ICS 100 accounts by processing the status and ownership information of certain ICS 100 accounts. In some embodiments, the full response circuit 244 may be structured to process the status and ownership information from the validation circuit 242.

Referring still to the services circuit 240, in an exemplary embodiment the lending circuit 246 may be structured to process a new or existing ICS 100 account (e.g., enroll new lending account, provide increased lending, etc.). Also, in an exemplary embodiment, the ATM circuit 248 may be structured to provide ICS 100 account information (e.g., checking, credit card, etc.) and/or process the ICS 100 account (e.g., process payment of an account balance).

As shown in FIG. 2, the transact circuit 250 may also include a plurality of circuits that are generally structured to initiate, process, and/or provide information relating to certain payments. The transact circuit 250 includes a payment initiation circuit 252, an automated clearing house (ACH) payment circuit 254, a push to card circuit 256, a real time payment circuit 258, and a wire payment circuit 260. In an exemplary embodiment, the payment initiation circuit 252 may be structured to initiate payment to certain ICS 100 national and international accounts. Similarly, the payment initiation circuit 252 may be structure to process and respond to API calls relating to the status of payments to certain ICS 100 national and international accounts. The ACH payment circuit 254 may be structured to initiate payment to other ICS 100 accounts (e.g., customer accounts, supplier accounts, payroll accounts, marketplace accounts, etc.). In some embodiments, the ACH payment circuit 254 may be structured to process the payment of claims to certain ICS 100 accounts (e.g., policyholders, insurance accounts, etc.).

Still referring to the transact circuit 250, in an exemplary embodiment, the push to card circuit 256 may be structured to initiate and/or process payment to certain ICS 100 accounts (e.g., consumer debit accounts, life insurance accounts, etc.). The real time payment circuit 258 may also be structured to initiate and/or process payment to certain ICS 100 accounts (e.g., policyholders, medical accounts, etc.) in real-time. Also in an exemplary embodiment, the wire payment circuit 260 may be structured to initiate and/or process wire payment to certain ICS 100 accounts. In some embodiments, the wire payment circuit 260 may also be structured to process and provide the status of the wire payment, or process and provide receipt of the wire payment.

As shown in FIG. 2, the API gateway circuit 138 includes an institutions circuit 270. The institutions circuit 270 may be structured to retrieve and provide information relating to ICS 100 institutions. For example, in an exemplary embodiment the institutions circuit 270 may be structured to provide information relating to a specific ICS 100 institution (e.g., geographic location, services offered, scheduling information, etc.). In some embodiments, the institutions circuit 270 may be structured to process an input (e.g., a current location, service preferences, dialect preference, etc.). In response, the institutions circuit 270 may be configured to provide information on fixed locations of facilities relating to the institution based on the input (e.g., closest facility to the user, services offered at the facility, directions to the facility, available appointments at the facility, etc.).

As shown in FIG. 2, the API gateway circuit 138 may also include a security circuit 276. The security circuit 276 may be structured to authenticate and/or validate a user accessing the ICS controller 104 (e.g., from the external devices or applications) to ensure sharing and permission preferences. The security circuit 276 may authenticate and/or validate a user via a variety of modalities input into the external devices or applications, for example a password, a fingerprint scan, a retinal scan, a voice sample, a face scan, and/or any other type of biometric security scan. The security circuit 276 may also be structured to process (e.g., verify) a supplemental authentication when applicable (e.g., a two-factor authentication (2FA) is presented on the enterprise resource(s) 128 and/or user device 134). The supplemental authentication may occur as part of a process to authorize an enterprise resource 128 (e.g., ERP application(s) 128, CRM application(s) 129, etc.) to access data or content (e.g., ICS data) from the ICS 100 (e.g., the ICS controller 104).

Figure 4:
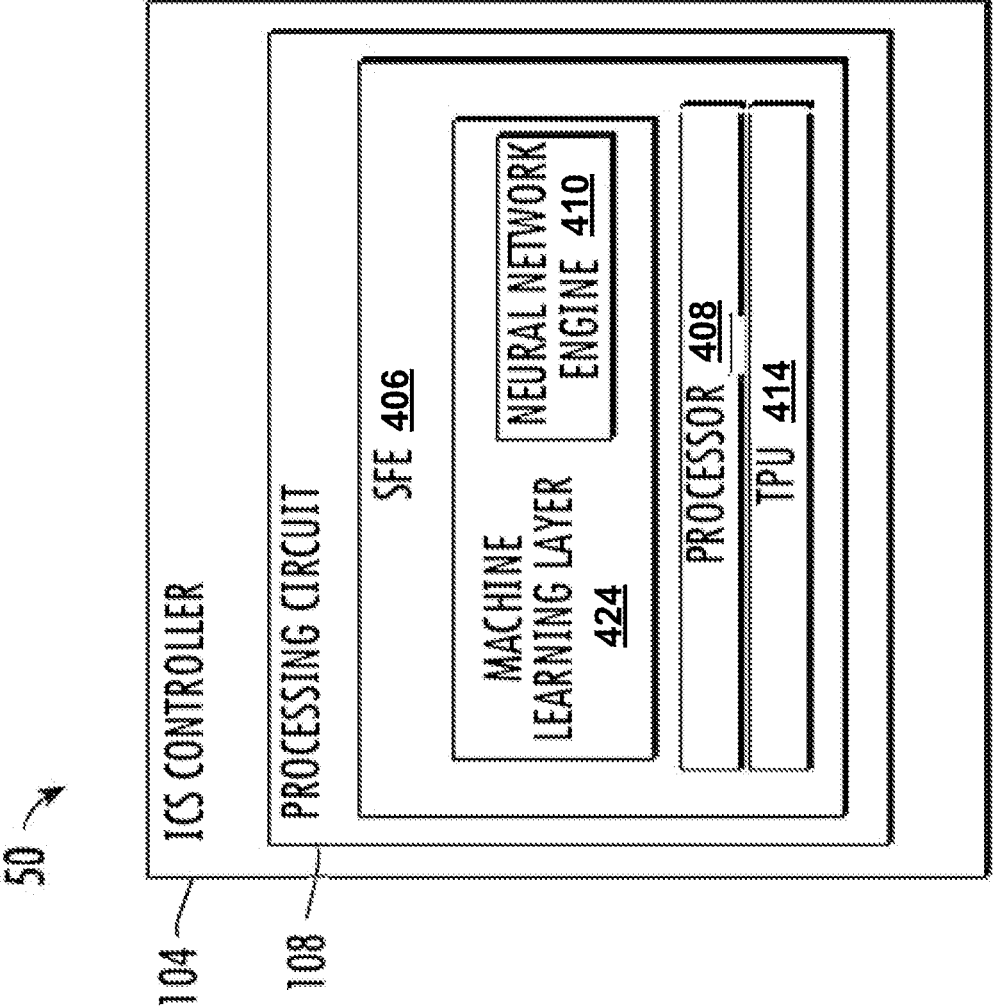
FIG. 4 is a schematic diagram of the processing circuit in the ICS controller of the computing system of FIG. 1 including a smart financial engine, according to an exemplary embodiment.

Referring to FIG. 1 and FIG. 4, in some embodiments, the ICS controller 104 may include a smart financial engine 406. Specifically, FIG. 4 shows a schematic diagram of the processing circuit 108 in the ICS controller 104, as part of computing system 50 may include a smart financial engine (SFE) 406 as shown, according to an exemplary embodiment. SFE is shown to include a machine learning layer 424, a processor 608, and a tensor processing unit (TPU) 414.

SFE 406 may be configured to receive enterprise resources 128 data, including data from CRM applications 129 and data from ERP applications 130. Data received by the SFE 406 may include, for example, accounts receivable data, accounts payable data, account balance data (derived from one or more enterprises), liquid asset data, illiquid asset data, 401K data, investment retirement account (IRA) data, property holding data, investment opportunities, collateral backing opportunities, refinance opportunities, user 132 feedback (e.g., whether a customer, customer relationship manager, or the like ranked (or scored) the recommendation as "positive" or "negative", whether the customer, customer relationship manager, or the like ranked (or scored) the recommendation as aggressive, conservative or moderate), and the like.

The SFE 406 may access enterprise resources 128 using the API gateway circuit 138 described above with reference to FIG. 1. The SFE 406 may also access one or more databases using API gateway circuit 138. In some embodiments, the data received from databases may include trained machine learning models, thresholds, and the like. Alternatively or additionally, an enterprise may store trained machine learning models and/or threshold. Alternatively or additionally, the SFE 406 may store the trained machine learning models and/or thresholds. As such, the SFE 406 may include, maintain, or otherwise access the trained machine learning models described herein.

Figure 3:
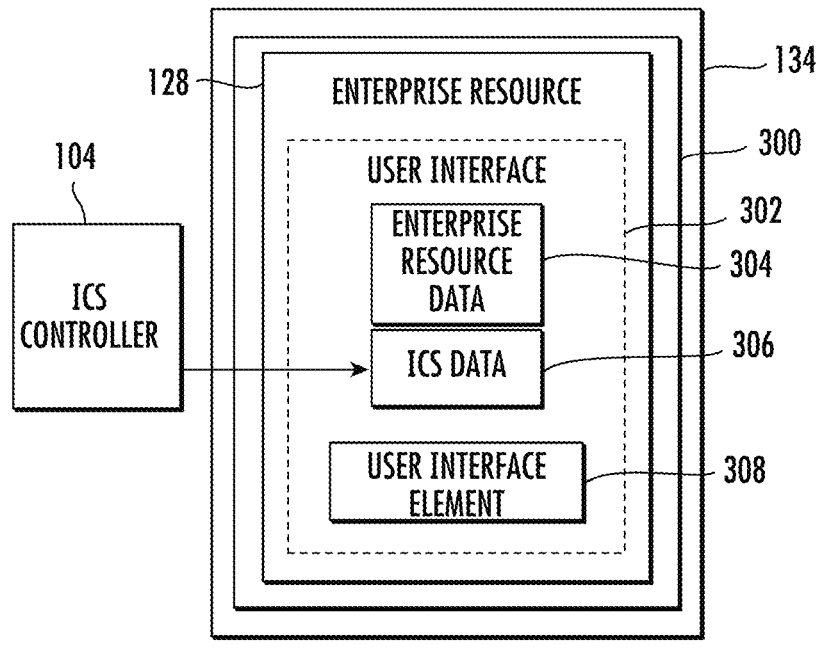
FIG. 3 is a diagram of a user device of FIG. 1 accessing an enterprise resource that displays institution computing system data, according to an exemplary embodiment.

In some embodiments, a user 132 may configure the SFE 406 by interacting with a user interface (e.g., user interface 302 in FIG. 3). For example, a user 132 may configure various thresholds or select machine learning models to be implemented via SFE 406. In some embodiments, the SFE 406 receives the user's 132 instructions and/or configurations using an API (e.g., via the API gateway circuit 138).

A processor 608 may be the logic in a device (e.g., SFE 406) that receives software instructions. A central processing unit (CPU) may be considered any logic circuit that responds to and processes instructions. CPUs are configured to execute various types of instructions. One or more algorithmic logic units (ALU) may be incorporated in processors to perform necessary calculations in the event an instruction requires a calculation be performed. When a CPU performs a calculation, it performs the calculation, stores the calculation in memory, and reads the next instruction to determine what to do with the calculation.

A different type of processor 608 utilized in SFE 406 may be the graphics processing unit (GPU). The SFE 406 may include both GPU and CPU processors 608. A GPU is a specialized electronic circuit designed to quickly perform calculations and access memory. As GPUs are specifically designed to perform calculations quickly, GPUs may have many ALUs allowing for parallel calculations. Parallel calculations mean that calculations are performed more quickly (e.g., in parallel to other tasks being performed by the processor 608). GPUs, while specialized, are still flexible in that they are able to support various applications and software instructions. As GPUs are still relatively flexible in the applications they service, GPUs are similar to CPUs in that GPUs perform calculations and subsequently store the calculations in memory as the next instruction is read.

In some embodiments, processor 608 may include a neural network engine 410. In other embodiments, the SFE 406 may access the neural network engine 410 using an API. That is, each machine learning model may have an associated API that may be used to call the machine learning model. Instructions for invoking various machine learning models in the machine learning layer 424 may be stored in memory 116. The various machine learning models may include neural networks (including convolutional neural networks, deep neural networks), Support Vector Machines (SVMs), Random Forests, and the like.

Employing APIs to invoke machine learning models allows the machine learning models to be implemented in different environments. For example, the machine learning models may be implemented in cloud or on-premise environments. In addition, machine learning models may be added over time (e.g., by a user 132 using a user interface 302).

Processor 608 may call machine learning models using the instructions stored in memory 116, access databases using the instructions stored in memory 116, and may receive information from a user interface 302 using the instructions stored in memory 116. The use of APIs facilitates the scalability of SFE 406.

A neural network engine 410 is an engine that utilizes the inherent parallelisms in a neural network to improve and speed up the time required for calculations. For example, generally, processors performing neural network instructions perform the neural network calculations sequentially because of the dependencies in a neural network. For example, the inputs to one neuron in a network may be the outputs from the previous neuron. In other words, a neuron in a first layer may receive inputs, perform calculations, and pass the output to the next neuron. However, many of the same computations are performed numerous times during the execution of the neural network. For example, multiplication, addition and executing activation functions are performed at every neuron. Further, while neurons within the same layer may be dependent on one another, neurons are independent from neurons in other layers. Thus, a neural network engine 410 may be used to capitalize on the parallelisms of a neural network. For example, every addition, multiplication and execution of the activation function may be performed simultaneously for different neurons in different layers.

In addition to CPUs and GPUs, SFE 406 may additionally have a tensor processing unit (TPU) 414. TPU 414, while still a processor like a CPU and GPU, is an Artificial Intelligence application-specific integrated circuit. TPUs may not require any memory, as their purpose is to perform computations quickly. Thus, TPU 414 performs calculations and subsequently passes the calculations to an ALU or outputs the calculations such that more calculations may be performed. Thus, TPUs may be faster than their counterparts CPUs and GPUs.

Section II: Machine Learning Model(s)

Figure 5:
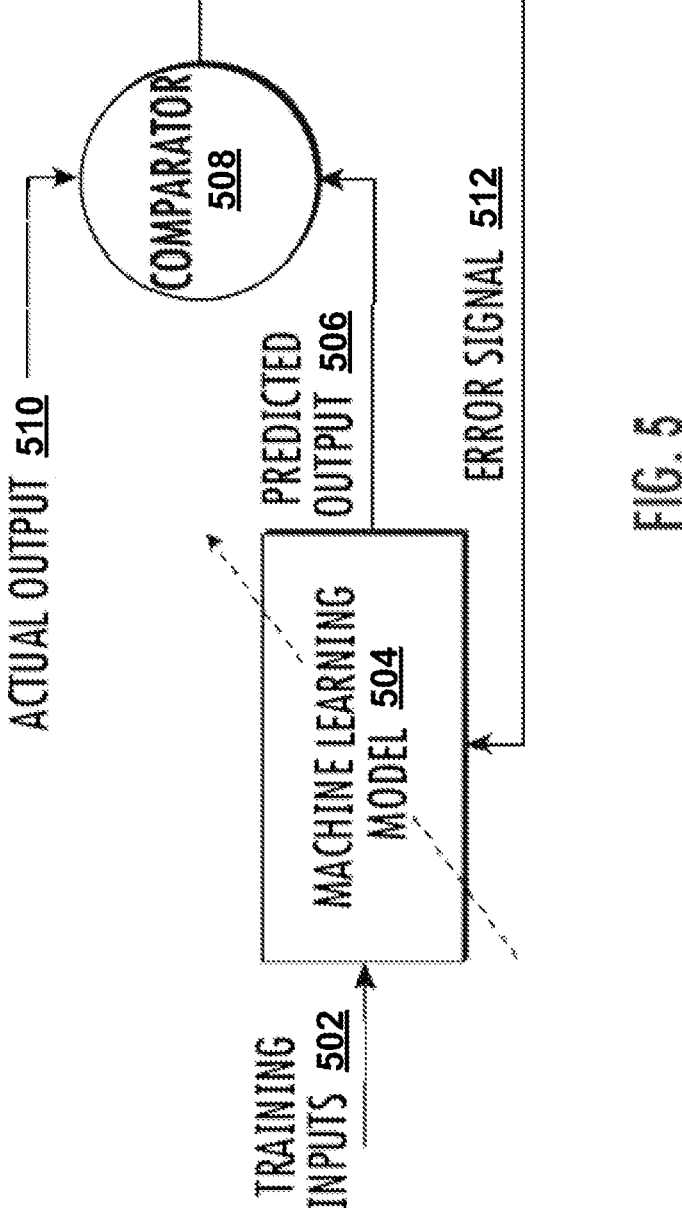
FIG. 5 is a block diagram of an example system using supervised learning, according to an exemplary embodiment.

Referring to FIG. 5, a block diagram of an example system using supervised learning, is shown. Supervised learning is a method of training a machine learning model given input-output pairs. An input-output pair is an input with an associated known output (e.g., an expected output).

Machine learning model 504 may be trained on known input-output pairs such that the machine learning model 504 can learn how to predict known outputs given known inputs. Once the machine learning model 504 has learned how to predict known input-output pairs, the machine learning model 504 can operate on unknown inputs to predict an output.

The machine learning model 504 may be trained based on general data and/or granular data (e.g., data based on a specific user 132) such that the machine learning model 504 may be trained specific to a particular user 132.

Training inputs 502 and actual outputs 510 may be provided to the machine learning model 504. Training inputs 502 may include accounts receivable data, accounts payable data, account balance data, liquid asset data, illiquid asset data, 401k data, IRA data, and the like. Actual outputs 510 may include recommendations (e.g., investment opportunities, collateral backing opportunities, refinance opportunities, and the like), user feedback (e.g., whether a customer, customer relationship manager, or other specialist ranked (or scored) the recommendation as positive or negative, whether the customer, customer relationship manager, or the like ranked (or scored) the recommendation as aggressive, conservative or moderate), actual future accounts receivable data, actual future accounts payable data, actual future account balance data, actual future liquid asset data, actual future illiquid asset data, actual future 401k data, actual future IRA data, and the like.

The inputs 502 and actual outputs 510 may be received from historic enterprise resource 128 data from any of the data repositories. For example, a data repository of an enterprise resource 128 may contain an account balance of a user 132 a year ago. The data repository may also contain data associated with the same account six months ago and/or data associated with the same account currently. Thus, the machine learning model 504 may be trained to predict future account balance information (e.g., account balance information one year into the future or account balance information six months into the feature) based on the training inputs 502 and actual outputs 510 used to train the machine learning model 504.

The SFE 406 may include one or more machine learning models 504. In an embodiment, a first machine learning model 504 may be trained to predict data associated with a financial state of a user 132 based on current user 132 enterprise resource 128 data. For example, the first machine learning model 504 may use the training inputs 502 (e.g., accounts receivable data, accounts payable data, account balance data, liquid asset data, illiquid asset data, 401k data, IRA data, and the like) to predict outputs 506 (e.g., future accounts receivable data, future accounts payable data, future account balance data, future liquid asset data, future illiquid asset data, future 401k data, future IRA data, and the like), by applying the current state of the first machine learning model 504 to the training inputs 502. The comparator 508 may compare the predicted outputs 506 to actual outputs 510 (e.g., actual future accounts receivable data, actual future accounts payable data, actual future account balance data, actual future liquid asset data, actual future illiquid asset data, actual future 401k data, actual future IRA data, and the like) to determine an amount of error or differences. For example, the future predicted accounts receivable data (e.g., predicted output 506) may be compared to the actual accounts receivable data (e.g., actual output 510).

In other embodiments, a second machine learning model 504 may be trained to make one or more recommendations to the user 132 based on the predicted data of the financial state of the user 132. For example, the second machine learning model 504 may use the training inputs 502 (e.g., future accounts receivable data, future accounts payable data, future account balance data, future liquid asset data, future illiquid asset data, future 401k data, future IRA data, and the like) to predict outputs 506 (e.g., a probability of a predicted investment opportunity, a probability of a predicted collateral backing opportunity, a probability of a predicted refinance opportunity, and the like) by applying the current state of the second machine learning model 504 to the training inputs 502. The comparator 508 may compare the predicted outputs 506 to actual outputs 510 (e.g., a selected investment opportunity, a selected collateral backing, predicted refinance opportunity, and the like) to determine an amount of error or differences.

The actual outputs 510 may be determined based on historic data of recommendations made to the user 132 by a customer relationship manager or other specialist. In an illustrative non-limiting example, a user 132 six months ago may have been in a particular financial state. In response to being in the particular financial state, the user 132 may have been advised of to seek an additional loan with various identified collateral backing. Thus, the input-output pair would be the particular financial state of the user 132 and the loan with identified collateral backing. In another illustrative non-limiting example, a user 132 four months ago may have been in a particular financial state. In response to being the in particular financial state, the user 132 may have been advised to invest in one or more enterprises. The user 132 may have received 30 day notes and rates, 60 day notes and rates, and 90 day notes and rates and selected an investment opportunity. Thus, the input-output pair would be the particular financial state of the user 132 and the selected investment opportunity. Accordingly, the second machine learning model 504 may learn to predict a recommendation (e.g., investment opportunity, collateral backing, refinance opportunity) for a given financial state. As described in greater detail below, the recommendation may be provided to the user, to a team member associated with the enterprise (i.e., to provide the recommendation to the user), and/or to other entities associated with the enterprise and/or user (such as loan underwriters in some instances).

In some embodiments, a single machine leaning model 504 may be trained to make one or more recommendations to the user 132 based on current user 132 data received from enterprise resources 128. That is, a single machine leaning model may be trained using the training inputs 502 (e.g., accounts receivable data, accounts payable data, account balance data, liquid asset data, illiquid asset data, 401k data, IRA data, and the like) to predict outputs 506 (e.g., a probability of a predicted investment opportunity, a probability of a predicted collateral backing opportunity, a probability of a predicted refinance opportunity, and the like) by applying the current state of the machine learning model 504 to the training inputs 502. The comparator 508 may compare the predicted outputs 506 to actual outputs 510 (e.g., a selected investment opportunity, a selected collateral backing, a selected refinance opportunity, and the like) to determine an amount of error or differences. The actual outputs 510 may be determined based on historic data associated with the recommendation to the user 132 (e.g., determined by a customer relationship manager or other specialist).

Training the machine learning model 504 with the data from the enterprise resources 128 allows the machine learning model 504 to learn, and benefit from, the interplay between the current and future states of the user/entity and enterprise resource 128 data. For example, training the machine learning model to predict a future account balance with accounts receivable input data may result in improved accuracy of the future account balance. Conventional approaches may predict a future account balance information algorithmically, without consideration of other factors that may affect the future account balance such as accounts receivable data. Generally, machine learning models are configured to learn the dependencies between various inputs. Accordingly, the machine learning model 504 learns the dependencies between the enterprise resource data and other data/factors of the user, resulting in improved predictions over predictions that are determined individually and/or independently.

During training, the error (represented by error signal 512) determined by the comparator 508 may be used to adjust the weights in the machine learning model 504 such that the machine learning model 504 changes (or learns) over time. The machine learning model 504 may be trained using a backpropagation algorithm, for instance. The back-propagation algorithm operates by propagating the error signal 512. The error signal 512 may be calculated each iteration (e.g., each pair of training inputs 502 and associated actual outputs 510), batch and/or epoch, and propagated through the algorithmic weights in the machine learning model 504 such that the algorithmic weights adapt based on the amount of error. The error is minimized using a loss function. Non-limiting examples of loss functions may include the square error function, the root mean square error function, and/or the cross entropy error function.

The weighting coefficients of the machine learning model 504 may be tuned to reduce the amount of error, thereby minimizing the differences between (or otherwise converging) the predicted output 506 and the actual output 510. The machine learning model 504 may be trained until the error determined at the comparator 508 is within a certain threshold (or a threshold number of batches, epochs, or iterations have been reached). The trained machine learning model 504 and associated weighting coefficients may subsequently be stored in memory 116 or other data repository (e.g., a database) such that the machine learning model 504 may be employed on unknown data (e.g., not training inputs 502). Once trained and validated, the machine learning model 504 may be employed during a testing (or an inference phase). During testing, the machine learning model 504 may ingest unknown data to predict future data (e.g., accounts receivable, accounts payable, 401k data, IRA data, account balance, and the like).

Using the systems and methods described herein, the SFE 406 can have a formalized approach to estimate future enterprise resource 128 data in a single automated framework based on current enterprise resource 128 data. The SFE 406 uses the data available from the enterprise resources 128 to predict future data and a user 132 financial state.

Figure 6:
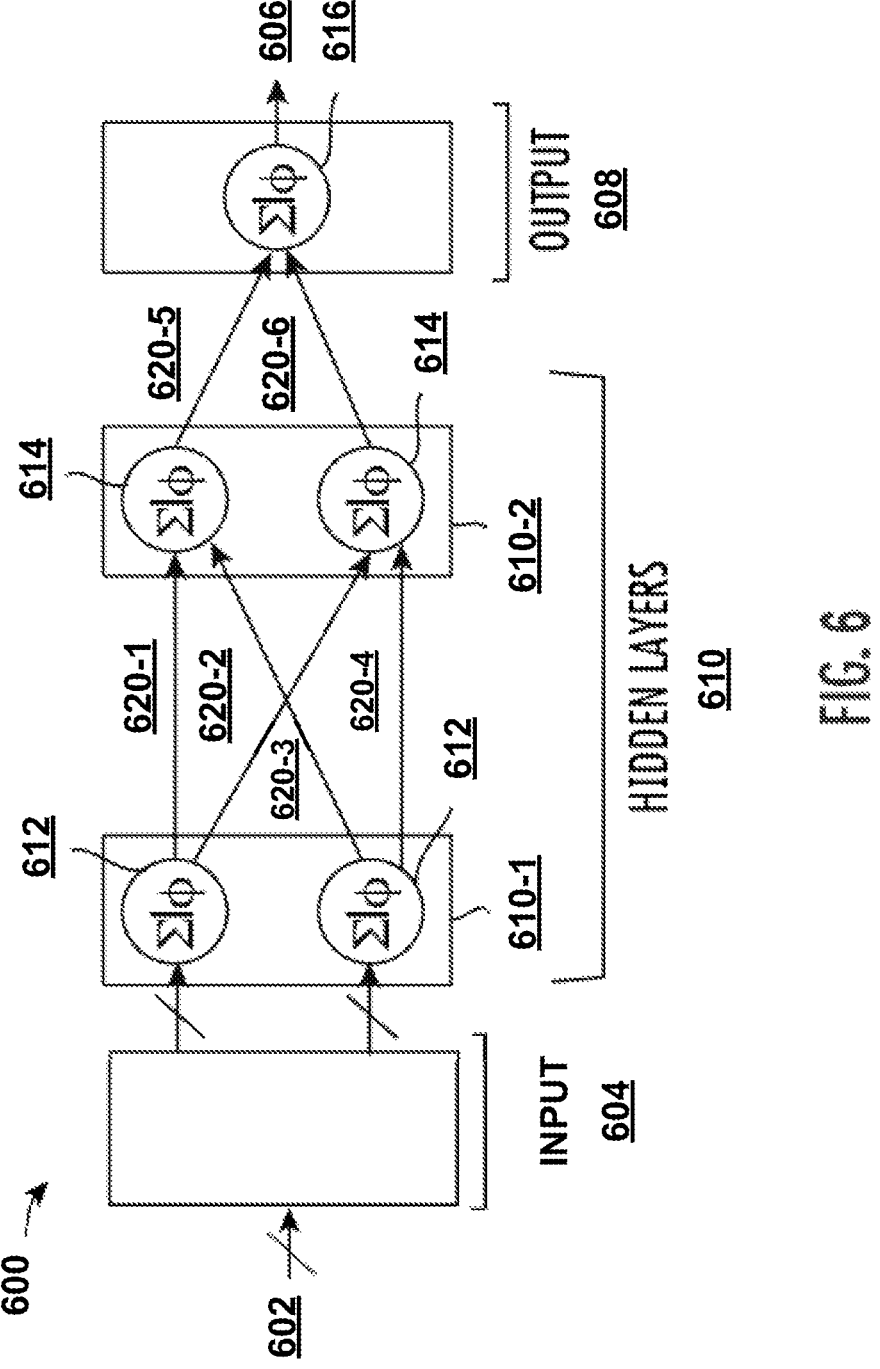
FIG. 6 is a block diagram of a simplified neural network model, according to an exemplary embodiment.

Referring to FIG. 6, a block diagram of a simplified neural network model 600 is shown. The neural network model 600 may include a stack of distinct layers (vertically oriented) that transform a variable number of inputs 602 being ingested by an input layer 604, into an output 606 at the output layer 608.

The neural network model 600 may include a number of hidden layers 610 between the input layer 604 and output layer 608. Each hidden layer has a respective number of nodes (612, 614 and 616). In the neural network model 600, the first hidden layer 610-1 has nodes 612, and the second hidden layer 610-2 has nodes 614. The nodes 612 and 614 perform a particular computation and are interconnected to the nodes of adjacent layers (e.g., nodes 612 in the first hidden layer 610-1 are connected to nodes 614 in a second hidden layer 610-2, and nodes 614 in the second hidden layer 610-2 are connected to nodes 616 in the output layer 608). Each of the nodes (612, 614 and 616) sum up the values from adjacent nodes and apply an activation function, allowing the neural network model 600 to detect nonlinear patterns in the inputs 602. Each of the nodes (612, 614 and 616) are interconnected by weights 620-1, 620-2, 620-3, 620-4, 620-5, 620-6 (collectively referred to as weights 620). Weights 620 are tuned during training to adjust the strength of the node. The adjustment of the strength of the node facilitates the neural network's ability to predict an accurate output 606.

In some embodiments, the output 606 may be one or more numbers. For example, output 606 may be a vector of real numbers subsequently classified by any classifier. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A).

Figure 7:
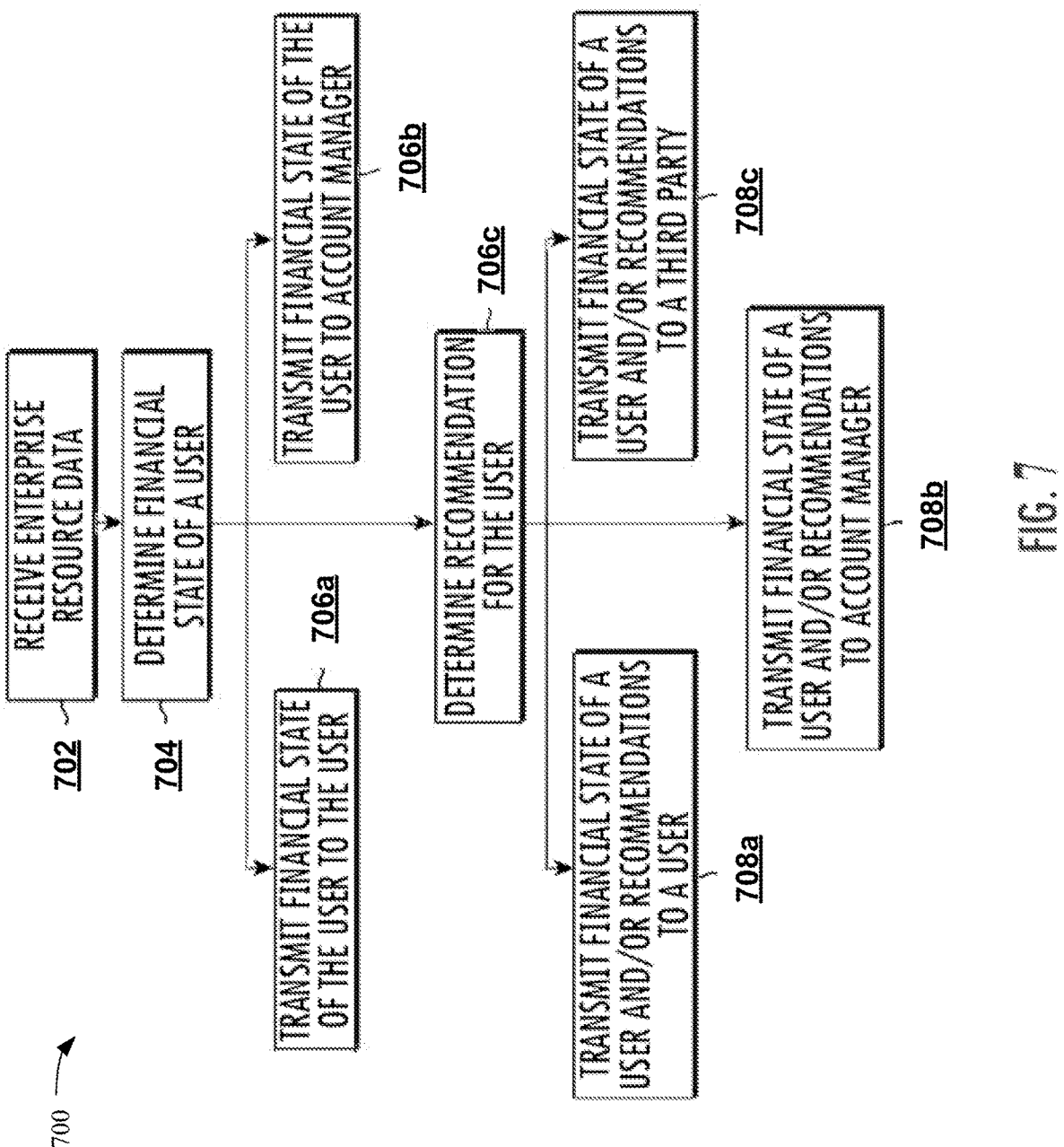
FIG. 7 is a flowchart of a process for providing real-time (or near real time) predictions to a user using the smart financial engine of FIG. 6, according to an exemplary embodiment.

Referring now to FIG. 7, a flow chart of a process 700 for providing real-time (or near real-time) SFE 406 predictions to a user is shown, according to an exemplary embodiment. The process 700 may include steps 702-708. However, other embodiments may include additional or alternative steps, or may omit one or more steps altogether. The method 900 is described as being executed using the computing system 50 of FIG. 1, and in particular the SFE of FIG. 4 such that reference is made to the components described above to aid in the description of process 700. However, one or more steps of process 700 may be executed by any number of computing systems. For example, one or more computing systems may locally perform part or all of the steps described in FIG. 7.

At step 702, the ICS 100 receives enterprise resource 128 data. The enterprise resource 128 data may include, for example, data which is maintained by the ICS 100 for an enterprise (i.e., enterprise account data 140 for instance), data which is maintained by an enterprise on enterprise computing devices and/or data which is maintained by a third party on behalf of an enterprise. The enterprise resource 128 data may include, for example, data which is provided to a customer relationship management (CRM) application 129, data which is provided to an enterprise resource planning (ERP) application 130, data which is provided during account setup at a financial institution, data which is maintained by third parties (i.e., publicly known information), etc. In some embodiments, the ICS controller 104 may receive enterprise resource 128 data via the communications interface 120 by CRM Application(s) 129, ERP Application(s) 130, and the like. Alternatively or additionally, the ICS controller 104 may receive enterprise resource 128 data via the communications interface 120 by a user device 134. For example, a user 132 may manually enter enterprise resource 128 data (e.g., 401k information) into a user device 134 which transmits the enterprise resource 128 data to the ICS controller 104 via the communications interface 120. The data received by the ICS controller 104 may be ingested by the SFE 406 and in particular, by a trained machine learning model 504.

In some embodiments, the ICS controller 104 may receive enterprise resource 128 data based on one or more user 132 inputs via a user device 134. For example, a user 132 may manually trigger SFE 406 using drop-downs buttons, highlighted rows, voice commands, etc.

In other embodiments, the ICS controller 104 may receive enterprise resource 128 data based on predetermined configurations. The predetermined configurations may include temporal triggers. For example, the ICS controller 104 may periodically (e.g., annually, every six months, quarterly, monthly, bi-weekly, weekly, daily, etc.) query one or more CRM Application(s) 129, ERP Application(s) 130, and the like (i.e., via API calls to corresponding APIs for the CRM application(s) and or ERP applications 129, 130) for enterprise resource 128 data.

In yet other embodiments, the ICS controller 104 may receive enterprise resource 128 data based on triggering conditions. A triggering condition may include monitoring enterprise resource 128 data obtained from CRM application(s) 129 and/or ERP application(s) 130, and determining that one or more thresholds have been satisfied. For example, the ICS controller 104 may monitor accounts payable data obtained from CRM application(s) 129 and/or ERP application(s) 130. Every time a predetermined number of accounts (such as one new account, two new accounts, etc.) are added as an account payable, the ICS controller 104 may be triggered to query CRM Application(s) 129, ERP Application(s) 130, and the like for enterprise resource 128 data.

Alternatively or additionally, the ICS controller 104 may be triggered to query CRM Application(s) 129, ERP Application(s) 130, and the like for enterprise resource 128 data in response to determining that a withdrawal (or deposit) satisfies a threshold. For example, transactions exceeding a threshold (determined by, for example, comparing an account balance at a first point in time and an account balance at a second point in time) may be a triggering condition.

It should also be appreciated that step 702 may be presupposed by an authentication of a user/user device-session in order to gain access the CRM application(s) 129, ERP application(s) 130 and/or the ICS 100. The authentication may be completed via the security circuit 276 of the ICS 100 prior to accessing or requesting any data via the ICS 100 via an API call (e.g., prior to the step 702). Any authentication may also be completed via a password, biometric scan, voice command, etc., as described above with regard to FIG. 2.

At step 704, the ICS controller 104 may determine a user's 132 financial state. The user's financial state may be a state of the user's 132 financial accounts. For example, the financial state of the user 132 may be a current or future state of the user's 132 accounts receivable data, accounts payable data, account balance data, liquid asset data, illiquid asset data, 401k data, IRA data, property holdings, and the like.

The user's 132 financial state may be determined by employing one or more trained machine learning models 504. For example, the trained machine learning model 504 may receive enterprise resource 128 data (e.g., accounts receivable data, accounts payable data, account balance data (derived from one or more enterprises), liquid asset data, illiquid asset data, 401K data, IRA data, property holding data, and the like) and determine a future financial state of the user's accounts receivable data, accounts payable data, account balance data, liquid asset data, illiquid asset data, 401k data, IRA data, and the like. The extent of the prediction of the financial state may depend on how the machine learning model 504 was trained (e.g., trained to predict a financial state six months into the future, trained to predict one year into the future, etc.).

In some embodiments, the dimensionality of the received enterprise resource 128 data may be reduced such that only statistically significant data (or other data determined to be relevant) is applied to the machine leaning model 504. For example, the SFE may reduce the dimensionality of the data received by the SFE 406 using clustering, support vector machines, decision trees, filtering, and the like. For example, statistically insignificant data (e.g., noise) may be removed using a Kalman filter, a Z-test, a T-test, or other machine learning model.

The ICS controller 104 may proceed to step 706a, 706b, 706c or some combination.

At step 706a, the ICS controller 104 may transmit the user's 132 financial state to the user 132. In some embodiments, the ICS controller 104 may transmit the information via a notification. The notification may include the predicted future financial state of the user's 132 accounts receivable data, accounts payable data, account balance data, liquid asset data, illiquid asset data, 401k data, IRA data, and the like. The notification may also categorize the predicted future financial state of the user 132.

In some embodiments, the SFE 406 may categorize the predicted financial state of the user 132 into negative and positive predicted financial states. For example, a negative financial state may be a in which the user 132 does not have enough money to pay various accounts payable at the end of a month. A positive financial state may be a state in which the user 132 has a surplus of money. In a different example, a positive financial state may be a state in which the user 132 has enough money available in one or more accounts to make the necessary monthly payments.

The SFE 406 may determine whether the financial state of the user is a negative financial state based on statistically or algorithmically combining (or comparing) one or more predicted outputs from the machine learning model 504. For example, the SFE 406 may compare the predicted accounts receivable data with the predicted account balance and predicted accounts payable data. If the predicted accounts payable value is greater than an aggregated predicated account balance and predicted accounts receivable value, then the SFE 406 may determine that the user is in a negative financial state.

In contrast, if the aggregated predicted account balance and predicted accounts receivable value is greater than the predicted accounts payable value (by a predetermined percentage amount, for example), then the SFE 406 may determine that the user 132 is not in a negative financial state. For instance, if the aggregated (e.g., sum) predicted account balance and predicted accounts receivable value is 10% greater than the predicted accounts payable value, then the SFE 406 may determine that the user 132 is not in a negative financial state. In some embodiments, if the SFE 406 determines that the user 132 is not in a negative financial state, then the SFE 406 may determine that the user 132 is in a positive financial state.

In other embodiments, the SFE 406 may employ one or more thresholds (statically or dynamically determined) to evaluate whether the user 132 is in a positive financial state. For example, if the aggregated predicted account balance and predicted accounts receivable value is 10% greater than the predicted accounts payable value, then the SFE 406 may determine that the user is not in a negative financial state, and if aggregated predicted account balance and predicted accounts receivable value is 30% greater than the predicted accounts payable value, then the SFE 406 may determine that the user is in a positive financial state.

At step 706b, the ICS controller 104 may transmit the user's 132 financial state to an account manager (i.e., rather than the user). For example, the ICS controller 104 may transmit the user's financial state to a customer relationship manager which is assigned (i.e., in the CRM application 129) to the user or entity. The customer relationship manager may be an account manager at the institution corresponding to the ICS controller 104. The customer relationship manager may use the financial state for updating a financial plan for the user, for determining one or more recommendations for the customer, etc. In some embodiments, the ICS controller 104 may transmit the information via a notification. The notification may include the future financial state of the user's 132 accounts receivable data, accounts payable data, account balance data, liquid asset data, illiquid asset data, 401k data, IRA data, and the like. The notification may also categorize the future financial state of the user 132 into positive and/or negative financial states, as discussed herein.

At step 706c, the ICS controller 104 may determine a recommendation for the user 132. That is, the financial state information may be fed into one or more downstream applications. More specifically, the SFE 406 may determine a recommendation for the user 132 using a machine learning model 504 trained to receive financial state information such as enterprise resource 128 data including accounts receivable data, accounts payable data, account balance data, liquid asset data, illiquid asset data, 401k data, IRA data, property holdings, and the like and predict recommendations (e.g., opening an account, transferring holdings between accounts to optimize savings, investing money in stocks, investing money in bonds, investing money with various companies, taking out a loan, identifying property as collateral, identifying future accounts receivable as collateral, refinancing a loan, and the like).

Alternatively or additionally, the machine learning model 504 may be trained to receive predicted financial state information such as future accounts receivable data, future accounts payable data, future account balance data, future liquid asset data, future illiquid asset data, future 401k data, future IRA data, future property holdings, and the like and predict recommendations (e.g., investing money in stocks, investing money in bonds, investing money with various companies, identifying property as collateral, identifying future accounts receivable as collateral, refinancing a loan, and the like).

The output of the machine learning model 504 may include probabilities of various recommendations. The SFE 406 may determine a recommendation based on the recommendation with the maximum probability. The recommendation may indicate a recommendation with the highest probability that a customer relationship manager would recommend, and/or a recommendation that results in the highest probability of a favorable outcome. For example, a favorable outcome may be an outcome that includes the user's 132 account balance and accounts receivable value being greater than the user's 132 accounts payable value. Recommendations may be based on historic recommendations and include recommending the user 132 to invest their money in stocks, invest their money in bonds, invest their money with various companies, identify property as collateral, identify future accounts receivable as collateral, refinance the loan, and the like.

Alternatively or additionally, in response to a user 132 input, SFE 406 may determine a particularly classified recommendation. Recommendations may be classified into various groups, where groups of recommendations may include aggressive recommendations, conservative recommendations, or moderate recommendations. The recommendations may be classified and/or grouped based on information received from customer and/or customer relationship managers feedback. The SFE 406 may employ clustering (such as k-means clustering or other suitable unsupervised learning methods) to determine the recommendations in the groups of recommendations.

In k-means clustering, for example, groups of recommendations may be clustered by randomly generating a centroid and associating a group of recommendations (e.g., aggressive recommendations, conservative recommendations, or moderate recommendations) with the centroid. Recommendations may be clustered based on relative distances between the recommendations and the centroids. The centroids may be moved to new relative locations based on minimizing the average distance of each of the recommendations associated with the centroid. Each time the centroid moves, the distance between the recommendations and the centroid may be recalculated. The clustering process may iterate until a stopping criteria is met (e.g., recommendations do not change clusters, the sum of the distances is minimized, a maximum number of iterations is reached). In some embodiments, distances may be measured between the recommendations and centroids using Euclidean distance. In other embodiments, the distance between the recommendations and the centroids may be measured based on correlation features of the recommendations.

Alternatively or additionally, each recommendation may be treated as a centroid. The recommendations may be clustered based on the distances of the centroid recommendations to the other recommendations. Distance measure may include, for example, the smallest maximum distance to other recommendations, the smallest average distance to other recommendations, and the smallest sum of squares of distances to other recommendations.

Figure 8:
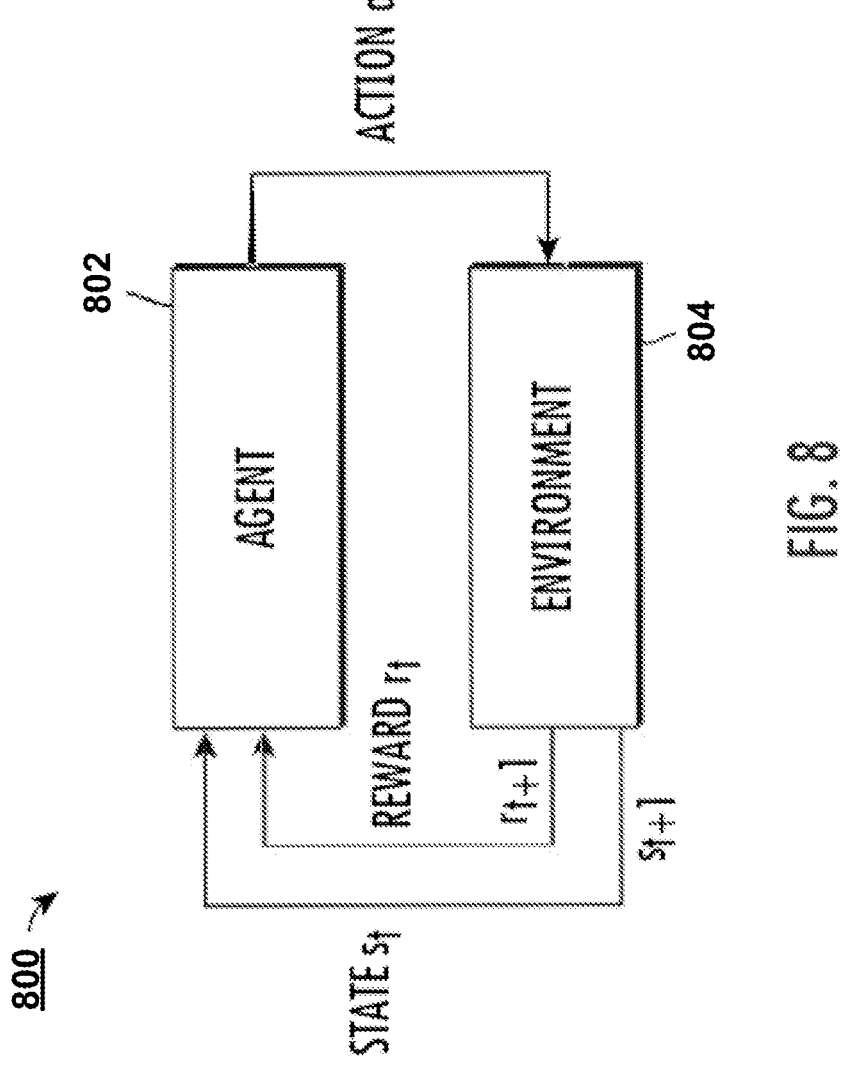
FIG. 8 is a block diagram of an example system using reinforcement learning, according to an exemplary embodiment.

In an example, a user 132 may use the user device 134 to select (e.g., via drop-down menus, scroll wheels, etc.) an aggressive recommendation. Accordingly, the SFE 406 may determine a recommendation from the group of aggressive recommendations with the maximum probability responsive to the user 132 selecting their preferred level of aggressiveness for a recommendation Referring now to FIG. 7 and FIG. 8, the SFE 606 may generate a recommendation for the user 132 using reinforcement learning. Specifically, FIG. 8 shows a block diagram of an example system using reinforcement learning. Reinforcement learning is a method of training a machine learning model using agents selecting actions to maximize rewards based on a policy network.

In reinforcement learning, an agent 802 interacts with an environment 804. As used herein, the "agent" 802 refers to the learner or the trainer. The environment 804 refers to the predicted financial state of the user 132. At each time step t (e.g., each iteration), the agent 802 observes a state $s_t$ of the environment 804 and selects an action from a set of actions. The possible set of actions may include investing money in stocks, investing money in bonds, investing money with various companies, identifying property as collateral, identifying future accounts receivable as collateral, refinancing a loan, and the like.

Using reinforcement learning, for example, given the user's 132 environment 804, the agent 802 may recommend using collateral from ERP application 130 data. In particular, given the user's 132 predicted financial state (e.g., a negative financial state in which an accounts payable value is greater than an aggregated sum of an account balance and accounts receivable), the agent 802 may select an action of recommending a loan using a particular property as collateral for the loan.

Agents 802 may select an action based on the value of taking each action, where the value of selecting the action is defined as the expected reward received when taking that action from the possible set of actions. Agents 802 may select actions based on exploratory actions and exploitation actions. An exploratory action improves an agent's 802 knowledge about an action by using the explored action in a sequence resulting in a reward calculation. An exploitation action is a "greedy" action that exploits agent's 802 current action-value estimates. Using epsilon-greedy action selection, for example, the agent 802 balances exploratory actions and exploitation actions. The agent 802 may select an epsilon value and perform an exploitation action or an exploratory action based on the value of the epsilon and one or more exploitation and/or exploration thresholds. The agent 802 may randomly select an epsilon value and/or select an epsilon value from a predetermined distribution of epsilon values.

Agents 802 may also select an action using a policy $\pi$, where $\pi$ maps states (and observations) to actions. The policy $\pi$ gives the probability of taking a certain action when the agent 802 is in a certain state.

In response to selecting an action (or multiple actions), the environment 804 may change, and there may be a new state $s_{t+1}$. The agent 802 may receive and/or determine feedback, indicating how the action affected the environment 804.

The agent 802 learns (e.g., reconfigures its policy $\pi$) by taking actions and analyzing the rewards received. A reward functions can include, for example, $R(s_t)$, $R(s_t, a_t)$, and $R(s_t, a_t, s_{t+1})$. In some configurations, the reward may be a recommendation goodness function. For example, a reward function based on recommendation goodness may include various quadratic terms representing considerations determined by a customer relationship manager or other specialist when providing recommendations to user 132 based on the user's 132 financial state.

Each iteration (or after multiple iterations and/or steps), the agent 802 may select a policy $\pi$ (and an action) based on the current state $s_t$ and the agent 802 may calculates a reward. Each iteration, the agent 802 may iteratively increase a summation of rewards.

One goal of reinforcement learning is to determine a policy $\pi$ that maximizes the cumulative set of rewards, determined via the reward function. A core policy network evaluates the environment 804 and produces probabilistic distributions that the agent 802 uses to select how to modify the recommendation for a given user 132 financial state.

At each step (or series of steps) policies may be weighed based on the rewards determined such that certain policies (and actions) are encouraged and/or discouraged in response to the environment 804 being in a certain state. Weights may be determined to maximize the objective function (e.g., reward function) during training. The policies are optimized by taking the gradient of the objective function (e.g., a reward function) to maximize a cumulative sum of rewards at each step, or after a predetermined number of steps (e.g., a delayed reward).

In some embodiments, the rewards at each step may be compared (e.g., on an iterative basis) to a baseline. The baseline may be an expected performance (e.g., a customer relationship manager recommendation), or an average performance (e.g., an average recommendation over a series of steps). Evaluating a difference between the baseline and the reward is considered evaluating a value of advantage (or advantage value. The value of the advantage indicates how much better the reward is from the baseline (e.g., instead of an indication of which actions were rewarded and which actions were penalized).

The agents 802 may train themselves by choosing the action(s) based on policies that provide the highest cumulative set of rewards. The agents 802 of the machine learning model may continue training until a predetermined threshold has been satisfied. For instance, the machine leaning model may be trained until the advantage value is within a predetermined accuracy threshold. Alternatively or additionally, the machine learning model may be trained until a predetermined number of steps (or series of steps called episodes, or iterations) have been reached.

To improve the rate in which the agents learn, asynchronous advantage actor critic reinforcement learning may be performed by using processor 608 (e.g., a GPU) to instantiate multiple learning agents 802 in parallel. Each agent 802 asynchronously performs actions and calculates rewards using a single machine learning model (such as a deep neural network) and a global model.

In some configurations, policies may be updated every step (or predetermined number of steps) based on the cumulative rewards determined by each agent 802. Each agent 802 may contribute to the global policy such that the total knowledge of the global model increases and the global policy learns how to best modify the recommendations. Each time the global model is updated (e.g., after every step and/or predetermined number of steps), new weights are propagated back to agents 802 such that each agent 802 shares common policies.

The global model allows each agent 802 to have a more diversified training data and eliminates a need for synchronization of models associated with each agent 802. In other configurations, there may be models associated with each agent 802 and each agent 802 may calculate a reward using a corresponding machine learning model. In some embodiments, agents 802 in other servers may update the global model (e.g., federated learning).

Once trained and validated, the agents 802 may be employed during a testing (or an inference phase). During testing, the machine learning model (and in particular, the agents 802) may ingest unknown data to predict recommendations.

Referring now to FIG. 7 and FIG. 8, the SFE 606 may generate a recommendation for the user 132 using reinforcement learning. Specifically, FIG. 8 shows a block diagram of an example system using reinforcement learning. Reinforcement learning is a method of training a machine learning model using agents selecting actions to maximize rewards based on a policy network.

In reinforcement learning, an agent 802 interacts with an environment 804. As used herein, the "agent" 802 refers to the learner or the trainer. The environment 804 refers to the predicted financial state of the user 132. At each time step/(e.g., each iteration), the agent 802 observes a state $s_t$ of the environment 804 and selects an action from a set of actions. The possible set of actions may include investing money in stocks, investing money in bonds, investing money with various companies, identifying property as collateral, identifying future accounts receivable as collateral, refinancing a loan, and the like.

Using reinforcement learning, for example, given the user's 132 environment 804, the agent 802 may recommend using collateral from ERP application 130 data. In particular, given the user's 132 predicted financial state (e.g., a negative financial state in which an accounts payable value is greater than an aggregated sum of an account balance and accounts receivable), the agent 802 may select an action of recommending a loan using a particular property as collateral for the loan.

Agents 802 may select an action based on the value of taking each action, where the value of selecting the action is defined as the expected reward received when taking that action from the possible set of actions. Agents 802 may select actions based on exploratory actions and exploitation actions. An exploratory action improves an agent's 802 knowledge about an action by using the explored action in a sequence resulting in a reward calculation. An exploitation action is a "greedy" action that exploits agent's 802 current action-value estimates. Using epsilon-greedy action selection, for example, the agent 802 balances exploratory actions and exploitation actions. The agent 802 may select an epsilon value and perform an exploitation action or an exploratory action based on the value of the epsilon and one or more exploitation and/or exploration thresholds. The agent 802 may randomly select an epsilon value and/or select an epsilon value from a predetermined distribution of epsilon values.

Agents 802 may also select an action using a policy π, where π maps states (and observations) to actions. The policy π gives the probability of taking a certain action when the agent 802 is in a certain state.

In response to selecting an action (or multiple actions), the environment 804 may change, and there may be a new state $s_{t+1}$. The agent 802 may receive and/or determine feedback, indicating how the action affected the environment 804.

The agent 802 learns (e.g., reconfigures its policy π) by taking actions and analyzing the rewards received. A reward functions can include, for example, $R(s_t)$, $R(s_t, a_t)$, and $R(s_t, a_t, s_{t+1})$. In some configurations, the reward may be a recommendation goodness function. For example, a reward function based on recommendation goodness may include various quadratic terms representing considerations determined by a customer relationship manager or other specialist when providing recommendations to user 132 based on the user's 132 financial state.

Each iteration (or after multiple iterations and/or steps), the agent 802 may select a policy π (and an action) based on the current state $s_t$ and the agent 802 may calculates a reward. Each iteration, the agent 802 may iteratively increase a summation of rewards.

One goal of reinforcement learning is to determine a policy π that maximizes the cumulative set of rewards, determined via the reward function. A core policy network evaluates the environment 804 and produces probabilistic distributions that the agent 802 uses to select how to modify the recommendation for a given user 132 financial state.

At each step (or series of steps) policies may be weighed based on the rewards determined such that certain policies (and actions) are encouraged and/or discouraged in response to the environment 804 being in a certain state. Weights may be determined to maximize the objective function (e.g., reward function) during training. The policies are optimized by taking the gradient of the objective function (e.g., a reward function) to maximize a cumulative sum of rewards at each step, or after a predetermined number of steps (e.g., a delayed reward).

In some embodiments, the rewards at each step may be compared (e.g., on an iterative basis) to a baseline. The baseline may be an expected performance (e.g., a customer relationship manager recommendation), or an average performance (e.g., an average recommendation over a series of steps). Evaluating a difference between the baseline and the reward is considered evaluating a value of advantage (or advantage value. The value of the advantage indicates how much better the reward is from the baseline (e.g., instead of an indication of which actions were rewarded and which actions were penalized).

The agents 802 may train themselves by choosing the action(s) based on policies that provide the highest cumulative set of rewards. The agents 802 of the machine learning model may continue training until a predetermined threshold has been satisfied. For instance, the machine leaning model may be trained until the advantage value is within a predetermined accuracy threshold. Alternatively or additionally, the machine learning model may be trained until a predetermined number of steps (or series of steps called episodes, or iterations) have been reached.

To improve the rate in which the agents learn, asynchronous advantage actor critic reinforcement learning may be performed by using processor 608 (e.g., a GPU) to instantiate multiple learning agents 802 in parallel. Each agent 802 asynchronously performs actions and calculates rewards using a single machine learning model (such as a deep neural network) and a global model.

In some configurations, policies may be updated every step (or predetermined number of steps) based on the cumulative rewards determined by each agent 802. Each agent 802 may contribute to the global policy such that the total knowledge of the global model increases and the global policy learns how to best modify the recommendations. Each time the global model is updated (e.g., after every step and/or predetermined number of steps), new weights are propagated back to agents 802 such that each agent 802 shares common policies.

The global model allows each agent 802 to have a more diversified training data and eliminates a need for synchronization of models associated with each agent 802. In other configurations, there may be models associated with each agent 802 and each agent 802 may calculate a reward using a corresponding machine learning model. In some embodiments, agents 802 in other servers may update the global model (e.g., federated learning).

Once trained and validated, the agents 802 may be employed during a testing (or an inference phase). During testing, the machine learning model (and in particular, the agents 802) may ingest unknown data to predict recommendations.

Referring back to FIG. 7, in some embodiments, other probabilistic analyses may be performed to determine one or more recommendations based on present or future financial state information. For example, a Monte Carlo simulation may be used to generate a probability distribution for each recommendation. Various recommendations may be mathematically represented using functions. For example, a recommendation function may include various quadratic terms representing considerations determined by a customer relationship manager or other specialist when providing recommendations to users 132 based on the user's 132 financial state.

One or more variables in a function may be assigned as a random variable such that each time an iteration is performed, a value will be selected for the random variable from a normal distribution, uniform distribution, lognormal distribution, and the like depending on the variable. For example, some variables may have values selected from a normal distribution of values, while other variables have values selected from a normal distribution of values.

The SFE 406 may determine a recommendation based on a maximum probability of each of the maximum probabilities of the Monte Carlo recommendation simulations. Alternatively or additionally, the SFE 406 may determine a maximum recommendation based on a group of recommendations, where the group of recommendations may include groups of aggressive recommendations, conservative recommendations, or moderate recommendations.

Referring back to FIG. 7, the ICS controller 104 may proceed to step 708a, 708b, 708c or some combination.

At step 708*a*, the ICS controller 104 may transmit the user's 132 financial state and the recommendations to the user 132. In some embodiments, the ICS controller 104 may transmit the information via a notification. The notification may include the future financial state of the user 132 (e.g., 132 accounts receivable data, accounts payable data, account balance data, liquid asset data, illiquid asset data, 401k data, IRA data, and the like) and the recommendation based on predicted data of a financial state of the user 132.

For example, the SFE 406 may determine in the future that the user 132 will not have enough liquid assets to pay their bills. Based on the future prediction of the financial state of the user 132 (e.g., not having enough liquid assets to pay their bills), the SFE 406 may recommend taking out a loan and using particular property as collateral backing. Accordingly, the user 132 may avoid the predicted future financial state (e.g., not having enough liquid assets to pay their bills) by presently taking out a loan and using the particular property as collateral backing.

At step 708*b*, the ICS controller 104 may transmit the user's 132 financial state and/or the recommendations to an account manager. Step 708*b* may be similar in some regards to step 706*b*. For example, the ICS controller 104 may transmit the recommendation to an account manager which is assigned to the user. The account manager may be a dedicated team member assigned to the accounts of the user. The account manager may be a general analyst who is receives the recommendation. In these and other embodiments, the account manager may provide the recommendation to the customer. The account manager may provide the recommendation generated by the ICS controller 104 accompanied with other recommendations (i.e., generated by the account manager and/or third parties). In some embodiments, the ICS controller 104 may transmit the information via a notification. The notification may include the future financial state of the user 132 (e.g., 132 accounts receivable data, accounts payable data, account balance data, liquid asset data, illiquid asset data, 401k data, IRA data, and the like) and the recommendation based on predicted data of a financial state of the user 132.

At step 708*c*, the ICS controller 104 may transmit the user's 132 financial state and/or the recommendations to a third party. The third party may be an underwriter associated with a loan which was applied for by the user (or an entity associated with the user). For example, the underwriter may be tasked with underwriting (or evaluating a likelihood of success) associated with the loan applied for by the user/entity. The ICS controller 104 may be configured to transmit the user's financial state and/or recommendations to a device or portal associated with the underwriter. The underwriter may user the financial state and/or recommendations for approving/denying a loan application, or otherwise receiving more information relating to an applicant. While traditionally underwriters do not have ERP/CRM data available to them, the systems and methods described herein leverage such data to provide recommendations and predicted future financial states, which may be used for loan underwriting decisions.

Section III: Systems and Methods for Generating Vendor Alerts From Analyzed Third Party Sources Customer relationship management (CRM) and/or enterprise resource planning (ERP) software may store information corresponding with one or more entities (e.g., vendors, customers, etc.) associated with the user (e.g., account holder) of the CRM and ERP application. For example, ERP software may store or otherwise access a list of entities the user transacts and corresponding data associated with each of the entities (e.g., delivery schedules, payment schedules, payment plans, outstanding invoices, outstanding purchase orders, etc.). As discussed further, systems and method for detecting an event associated with one of the entities associated with the user, wherein the event impacts the entities ability to continue to transact with the user, are described. The systems and methods leverage data from ERP software, CRM software, third party data, and/or real time financial data to detect an event associated with the entity and/or providing a recommendation corresponding an action to be taken as a result of the detected event.

Figure 9:
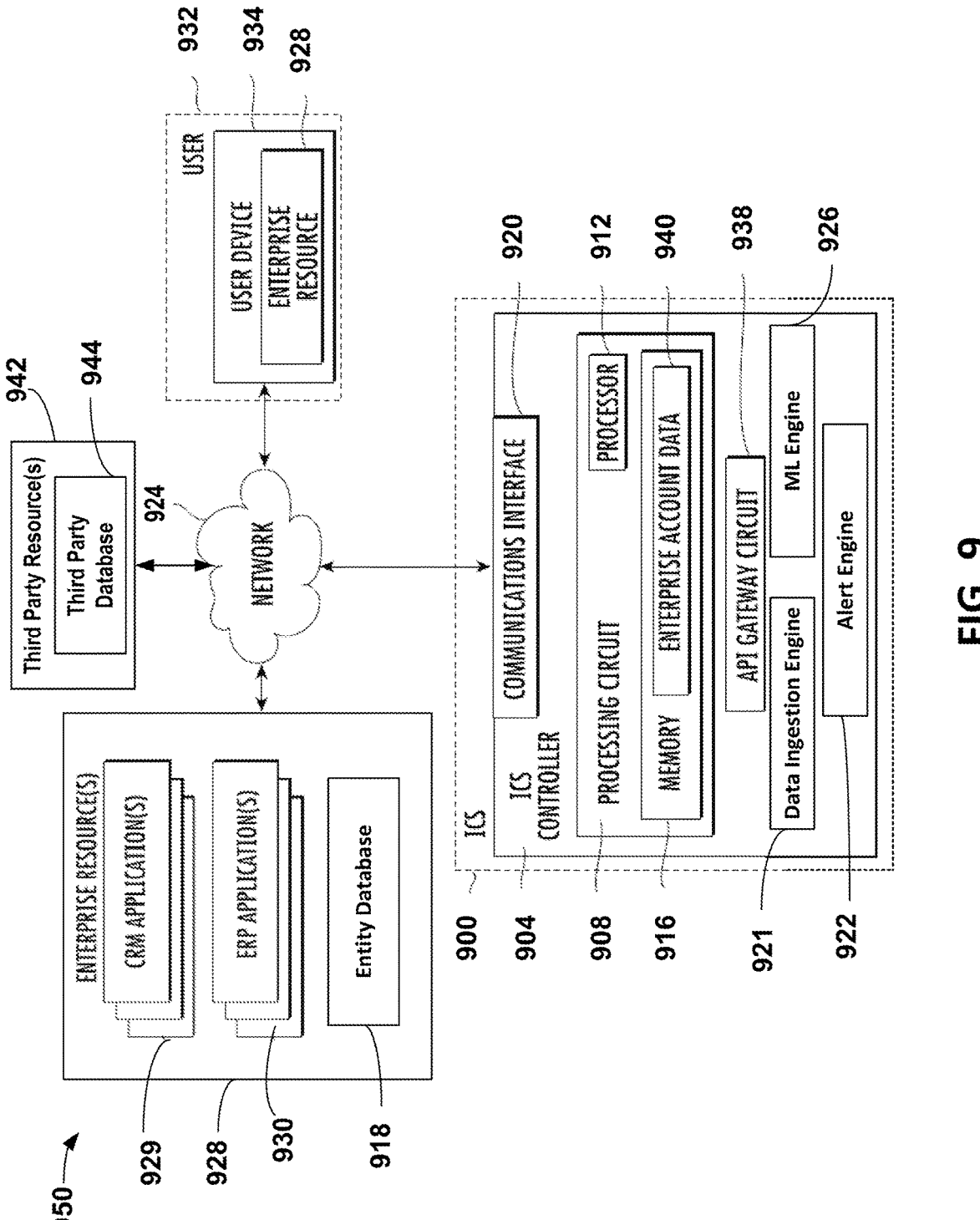
FIG. 9 is a system schematic diagram of another computing system, according to an exemplary embodiment.

Referring now to FIG. 9, a schematic diagram of a computing system 950 is shown, according to an exemplary embodiment. The computing system 950 may share one or more characteristics as any of the other computing systems described herein. For example, the computing system 950 is shown to include an institution computing system (ICS) 900, which includes an ICS controller 904. The ICS controller 904 includes a processing circuit 908, having a processor 912 and a memory 916. The ICS controller 904 may also include, and the processing circuit 908 may be communicably coupled to, a communications interface 920 such that the processing circuit 908 may send and receive content and data via the communications interface 920. As such, the ICS controller 904 may be structured to communicate via one or more networks 924 with other devices and/or applications. The computing system 950 is shown to include enterprise resources 928 including a plurality of CRM applications 929 and a plurality of ERP applications 930, and a user device 934 accessing an enterprise resource 928 (which may be one of the enterprise resources 928). In some embodiments, the ICS controller 904, the enterprise resources 928, and the user device 934 may be communicably coupled and configured to exchange data over the network 924, which may include one or more of the Internet, cellular network, Wi-Fi, Wi-Max, a proprietary banking network, a proprietary retail or service provider network, or other type of wired or wireless network.

The ICS controller 904 may be configured to transmit, receive, exchange, or otherwise provide data to one or more of the enterprise resources 928. The ICS controller 904 is shown to include an application programming interface (API) gateway circuit 938. The API gateway circuit 938 may be configured to facilitate the transmission, receipt, and/or exchange of data between the ICS controller 904 and the enterprise resources 928. Referring to FIG. 9 generally, the ICS controller 904 is associated with (e.g., owned, managed, and/or operated by) the institution computing system (ICS) 900. In the example depicted, the ICS 900 is a computing system configured to maintain data or content relating to one or more one or more enterprises (e.g., enterprise account data 940). According to the embodiments described herein, the ICS 900 may be configured to transmit existing enterprise account data 940 to one or more enterprise resources 928. For example, the ICS 900 may be configured to provide various content and data relating to different institution accounts, such as general ledger accounts, lending, money transfers, issuing credit or debit, etc. Thus, the ICS controller 904 is structured or configured to maintain and provide, or otherwise facilitate providing, the content and data (e.g., the enterprise account data 940) to devices and/or applications associated with internal or external users (e.g., users having an account with the institution corresponding to the ICS 900, users seeking to establish an account with the institution, etc.). In some embodiments, the ICS controller 904 is structured or configured control access to the enterprise account data 940 (e.g., by authenticating an enterprise resource 928 or a user of the enterprise resource 928).

In some embodiments, the ICS controller 904 may be implemented within a single computer (e.g., one server, one housing, etc.). In other embodiments, the ICS controller 904 may be distributed across multiple servers or computers, such as a group of two or more computing devices/servers, a distributed computing network, a cloud computing network, and/or any other type of computing system capable of accessing and communicating via local and/or global networks (e.g., the network 924). Further, while FIG. 9 shows applications outside of the ICS controller 904 (e.g., the network 924, the enterprise resources 928, etc.), in some embodiments, one or more of the enterprise resources 928 may be hosted within the ICS controller 904 (e.g., within memory 916).

As shown in FIG. 9, the ICS controller 904 is shown to include the processing circuit 908, including the processor 912 and the memory 916. The processing circuit 908 may be structured or configured to execute or implement the instructions, commands, and/or control processes described herein with respect to the processor 912 and/or the memory 916. FIG. 9 shows a configuration that represents an arrangement where the processor 912 is embodied in a machine or computer readable media, as described below. However, FIG. 9 is not meant to be limiting as the present disclosure contemplates other embodiments, such as where the processor 912, or at least one circuit of processing circuit 908 (or ICS controller 104), is configured as a hardware unit. All such combinations and variations are intended to fall within the scope of the present disclosure.

The processing circuit 908 is shown to include the processor 912. The processor 912 may be implemented or performed with a general purpose single- or multi-chip processor, a digital signal processor (DSP), an application specific integrated circuit (ASIC), one or more field programmable gate array (FPGAs), or other suitable electronic processing components. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the circuits of the processor 912 may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The processing circuit 908 is also shown to include the memory 916. The memory 916 (e.g., memory, memory unit, storage device, etc.) may include one or more devices (e.g., RAM, ROM, Flash memory, hard disk storage, etc.) for storing data and/or computer code for completing or facilitating the processes, layers, and modules described in the present application. The memory 916 may be or include tangible, non-transient volatile memory or non-volatile memory. The memory 916 may also include database components, object code components, script components, or any other type of information structure for supporting the activities and information structures described in the present application. According to an exemplary embodiment, the memory 916 is communicably connected to the processor 912 via the processing circuit 908 and includes computer code for executing (e.g., by the processing circuit 908 and/or the processor 912) one or more processes described herein.

The memory 916 is configured to store various data (e.g., some or all of the data required to perform the method 1000 described below). For example, the memory 916 may store a list of entities the user of the enterprise resources 928 transacts with, previously recorded data (e.g., previous invoice payment dates, a list of detected events associated with each of the entities, a database of third party data (e.g., the third party database 944) related to each of the entities, a database of alerts provided to the user in response to an event being detected, previous invoice payment amounts, historic account balances, etc.), current financial data (e.g., an account balance, outstanding invoices, accounts receivable, etc.), and/or anticipated financial events (e.g., scheduled invoice payment dates, schedule payment request dates, etc.).

As shown in FIG. 9, the ICS controller 904 is also shown to include an application programming interface (API) gateway circuit 938. In various embodiments, one or more third party resources 942 (e.g., search engine, website, database, etc.) may include API protocols that are used to establish an API session between the ICS controller 904 and the third party resources 942. In this regard, the API protocols and/or sessions may allow the ICS 900 to communicate content and data to and from the third party search engine via the network 924 and the communications interface 920. For example, the ICS controller 904 may retrieve data from a third party database 944, the data being related to one or more of the entities that transact with user of the ERP software.

In various embodiments, the external devices (e.g., CRM application(s) 929 or ERP application(s) 930 of the enterprise resources 928, user device 934 having enterprise resource 928, etc.) may include API protocols that are used to establish an API session between the ICS controller 904 and the external devices. In this regard, the API protocols and/or sessions may allow the ICS 900 to communicate content and data (e.g., associated with the institution's products and/or services) to be displayed directly within the external devices (e.g., CRM application(s) 929, ERP application(s) 930, user device 934, etc.). For example, the external device may activate an API protocol (e.g., via an API call), which may be communicated to the ICS controller 904 via the network 924 and the communications interface 920. The API gateway circuit 938 may receive the API call from the ICS controller 904, and the API gateway circuit 938 may process and respond to the API call by providing API response data. The API response data may be communicated to the external device via the ICS controller 904, communications interface 920 and the network 924. The external device may then access (e.g., display) the API response data (e.g., associated with the ICS 900 product and/or service) on the external device.

As such, the API gateway circuit 938 is structured to initiate, receive, process, and/or respond to API calls (e.g., via the ICS controller 904 and the communications interface 920) over the network 924. That is, the API gateway circuit 938 may be configured to facilitate the communication and exchange of content and data between the external devices (e.g., CRM applications 929, ERP applications 930, user device 934, etc.) and the ICS controller 904. Accordingly, to process various API calls, the API gateway circuit 938 may receive, process, and respond to API calls using other circuits, as discussed below. Additionally, the API gateway circuit 938 may be structured to receive communications (e.g., API calls, API response data, etc.) from other circuits. That is, other circuits may communicate content and data to the ICS controller 904 via the API gateway circuit 938. Therefore, the API gateway circuit 938 is communicatively coupled other circuits of the ICS controller 904, either tangibly via hardware, or indirectly via software.

The ICS 900 is further shown to include a data ingestion engine 921. The data ingestion engine 921 is configured to receive or otherwise retrieve vendor data, such as a list of entities, associated with the entity from the enterprise resources 928 and/or from the ICS 900. The data may include datasets including data entries that define one or more characteristics of the entities, such as a relationship type (e.g., supplier, customer, vendor, etc.), a list of outstanding invoices and/or purchase orders, payment due dates, payment amounts, one or more trade terms associated with payment of the invoice, etc. Further, the data ingestion engine 921 may be configured to receive or otherwise retrieve data or datasets associated with an entity the user transacts with, such as historic transactions between the user and an entity, data from the third party resources 942, etc.

The ICS 900 is further shown to include a machine learning (ML) engine 926. The ML engine 926 includes a first machine learning model that is configured to detect an event associated with an entity of the list of entities (e.g., via data from a third party resources 942) and output an alert in response to detecting the event, wherein the alert is displayable within a user interface. For example, the ML engine 926 may receive a dataset including a list of entities associated with an account holder of an account with the ERP application (e.g., pulled via API calls from the ERP application).

The ML engine 926 may then access or otherwise receive data from one or more third party resources 942 related to one or more of the entities of the list of entities. For example, the first ML model may leverage a third party search engine, one or more crawlers, one or more scrapers to gather or otherwise access various datasets that include data corresponding with one or more of the entities of the list of entities. The ML model may utilize/leverage data from various third party resources 942, including, but not limited to, third party news outlets, financial statements (e.g., 8-k filing, 10-k filing, 10-Q filing, etc.), online blogs, social media channels, etc.).

Additionally, the first ML model may access one or more invoice datasets (e.g., invoice datasets) from the ERP resources corresponding with entities. According to various embodiments, each invoice dataset includes a plurality of data entries corresponding to respective invoices. Each data entry of the plurality of data entries may define an amount, due date, and one or more trade terms associated with payment of the invoice. The invoice datasets may provide insight into outstanding debt and/or accounts receivable associated with the entity, which may not otherwise be publicly available. According to various embodiments, the invoice data (e.g., invoice datasets) is pulled via API calls from the ERP application 930 as described below.

The first machine learning model may then normalize the data received from the various third party resources 942. Normalizing the data may include normalizing the values of the data (e.g., scaling the data from 1-100), normalizing the terms used in the data, normalizing the lineage, normalizing the data types, and the like. For example, the first machine learning model may normalize the data using one hot encoding.

After normalization, the ML engine 926 evaluates the normalized dataset. For example, the first machine learning model may scrape the data from the third-party server (e.g., a first third-party server) to identify one or more identifiers of the entity included in the data (e.g., a name of the entity, a stock ticker associated with the entity, a name of one of the employees of the entity, an industry the entity is involved in, a location the entity is present or conducts business, etc.). The ML engine 926 may then generate a query for a second third-party server using the one or more identifiers. For example, the ML engine 926 may verify the entity identified in the data from the first third-party server as matching the entity in the list of entities in the dataset base on a response to the query from the second third-party server.

In general, the ML engine 926 may use the initial inputs to predict or identify events associated with one or more of the entities included in the list of entities, such as an bankruptcy, a merger, an acquisition, a supply chain interruption, sanctions, and/or any other event that may impact the entities ability to provide goods or services to the enterprise resources. The ML engine 926 may determine a score for the event. The score may be indicative of the severity of the event. For example, an event that is expected to significantly impact the entities ability to provide goods to the customer may have a higher score than an event that is may not significantly impact the entities ability to provide goods to the customer. Further, the ML engine 926 may generate a confidence score associated with the event. For example, the confidence score determined in response to an entity filing for bankruptcy may be higher than an unverified blog post that claims the entity may be filing for bankruptcy. Further, the entity identified in the data from the first third-party server as matching the entity in the list of entities in the dataset base on a response to the query from the second third-party server may result in an increased confidence score.

According to various embodiments, the ML engine 926 may include a second machine learning model. The second machine learning model may be trained to generate recommendations given one or more events as an input. For example, the first ML model may identify an event and provide the event, along with an event score and/or a confidence score, to a second machine learning model, which may determine a recommendation based on the input. For example, the second machine learning model may identify alternative good or service providers that are capable of providing comparable goods or services in response to detecting an event. The second machine learning model may further provide a recommendation in accordance with any of the other examples described herein. For example, if the first machine learning model detects a bankruptcy event that may prevent a customer of the user from remitting payment for an invoice in due course, the second machine learning model may recommend taking out a loan to ensure the user has sufficient funds available to continue doing business.

According to various embodiments, the ML engine 926 may receive additional inputs that fix one or more of the data entries. For example, a user input may be received from the user device 934 that fixes one or more of the data entries. For example, as described further below, the user may interact with a user interface to adjust one or more of the data entries. In response, the ML engine 926 may fix the corresponding data entries and optimize the remainder of the data entries while fixing the one or more data entries fixed by the user.

The ICS 900 is further shown to include an alert engine 922. The alert engine 922 is configured to generate one or more alerts, which may then be provided to another device for display. For example, the alert engine 922 may receive alerts (e.g., detected events, recommendations, etc.) from the ICS controller 904 (e.g., via the ML engine 926) and generate a corresponding user interface.

Still referring to FIG. 9, the computing system 950 may further include a plurality of enterprise resources 928. The enterprise resources 928 may be or include various systems or applications which are provided to an enterprise (e.g., by one or more service providers of the enterprise resource(s) 928). The enterprise resources 928 may be configured to facilitate management of resources corresponding to various entities in various industries. The enterprise resources 928 is shown to include a plurality of customer relationship management (CRM) applications 929. The CRM applications 929 may be or include applications for establishing leads on new customers, assisting in converting a lead to a sale, planning delivery, and so forth. The enterprise resources 928 is shown to include a plurality of ERP applications 930. The ERP applications 930 may include human resources (HR) or payroll applications, marketing applications, customer service applications, operations/project/supply chain management applications, commerce design applications, and the like.

The enterprise resources 928 is shown to further include invoice an entity database 918. The entity database 918 is configured to store a list of entities that transact with a user of the enterprise resources 928. For example, the list of entities may be received by or otherwise accessed by the CRM applications 929, the ERP applications 930, or any other enterprise resource 928. The entity database 918 may stores various data associated with each entity. For example, the entity database may sore one or more invoice datasets for each entity, trade terms for each entity, etc. According to various embodiments, each invoice dataset includes a plurality of data entries corresponding to respective invoices. Each data entry of the plurality of data entries may define an amount, due date, and one or more trade terms associated with payment of the invoice. According to various embodiments, the entity datasets are pulled via API calls from the ERP application 930 as described herein.

The enterprise resources 928 may be implemented on or otherwise hosted on a computing system, such as a discrete server, a group of two or more computing devices/servers, a distributed computing network, a cloud computing network, and/or another type of computing system capable of accessing and communicating using local and/or global networks (e.g., the network 924). Such computing system hosting the enterprise resources 928 may be maintained by a service provider corresponding to the enterprise resource(s) 928. The enterprise resources 928 may be accessible by various computing devices or user devices associated with an enterprise responsive to enrollment of the enterprise with the enterprise resources 928. The CRM applications 929 and/or the ERP applications 930 may include software and/or hardware capable of implementing a network-based or web-based applications (e.g., closed-source and/or open-source software like HTML, XML, WML, SGML, PHP, CGI, Dexterity, TypeScript, Node, etc.). Such software and/or hardware may be updated, revised, or otherwise maintained by resource or service providers of the enterprise resources 928. The CRM and ERP application(s) 929, 930 may be accessible by a representative(s) of a small or large business entity, any customer of the institution, and/or any registered (or unregistered) user of the products and/or service provided by one or more components of the computing system 950. As such, the enterprise resources 928 (including the CRM application(s) 929 and/or the ERP application(s) 930) may be or include a platform (or software suite) provided by one or more service providers which is accessible by an enterprise having an existing account with the ICS 900. In some instances, the enterprise resources 928 may be accessible by an enterprise that does not have an existing account with the ICS 900, but may open or otherwise establish an account with the ICS 900 using a CRM application 929 and/or an ERP application 930 of the enterprise resources 928, as described in greater detail below.

The enterprise resources 928 may be configured to establish connections with other systems in the computing system 950 (e.g., the ICS 900, the user device 934, etc.) via the network 924. Accordingly, the CRM application(s) 929 and/or ERP application(s) 930 of the enterprise resources 928 may be configured to transmit and/or receive content and data to and/or from the ICS controller 904 (e.g., via the communications interface 920) over the network 924. For example, and as described in greater detail below, an ERP application 930 (or CRM application 929) may activate an API protocol (e.g., via an API call) associated with the ICS 900 (e.g., to open an account, to request or apply for a loan instrument, to verify or determine an account balance, etc.). The API call may be communicated to the ICS controller 904 via the network 924 and the communications interface 920. The ICS controller 904 (e.g., the API gateway circuit 938) may receive, process, and respond to the API call by providing API response data. The API response data may be communicated to the ERP application 930 (or CRM application 929) via the communications interface 920 and the network 924, and the ERP application 930 (or CRM application 929) may access (e.g., analyze, display, review, etc.) the content and data received from the ICS 900.

In an exemplary embodiment, the enterprise resources 928 may be configured to include an interface that displays the content and data communicated from the ICS controller 904. For example, the enterprise resources 928 may include a graphical user interface, a mobile user interface, or any other suitable interface that may display the content and data (e.g., associated with products and services of the ICS 900) to the enterprise resources 928. In this regard, enterprise resources 928, and entities associated with the enterprise resources 928 (e.g., customers, employees, shareholders, policy holders, etc.), may access, view, analyze, etc. the content and data transmitted by the ICS controller 904 remotely using the enterprise resources 928.

Still referring to FIG. 9, the computing system 950 may further include a user device 934 associated e.g., owned by, used by, etc. with a user 932. The user device 934 may be or include a mobile phone, a tablet, a laptop, a desktop computer, an IoT-enabled device (e.g., an IoT-enabled smart car), a wearable device, a virtual/augmented reality (VR/AR) device, and/or other suitable user computing devices capable of accessing and communicating using local and/or global networks (e.g., the network 924). Wearable computing devices may refer to types of devices that an individual wears, including, but not limited to, a watch (e.g., a smart watch), glasses (e.g., eye glasses, sunglasses, smart glasses, etc.), bracelet (e.g., a smart bracelet), etc. In an exemplary embodiment, the user 932 may be a customer or client of the ICS 900 associated with the ICS controller 904 (e.g., a user having access to one or more accounts of another entity, such as a business or enterprise, another individual, etc.).

The user device 934 may be configured to establish connections with other systems in the computing system 950 (e.g., ICS 900, enterprise resources 928, etc.) via the network 924. Accordingly, the user device 934 may be able to transmit and/or receive content and data to and/or from the ICS controller 904 (e.g., via the communications interface 920) over the network 924. In some embodiments, the user device 934 may be able to transmit and/or receive content and data to and/or from the enterprise resources 928 over the network 924. In an exemplary embodiment, the user device 934 may include software and/or hardware capable of accessing a network-based or web-based application. For example, in some instances, the user device 934 may include an application that includes (closed-source and/or open-source) software such as HTML, XML, WML, SGML, PHP (Hypertext Preprocessor), CGI, Dexterity, TypeScript, Node, etc.

As shown in FIG. 9, the user device 934 is also shown to access an enterprise resource 928, which may be or include one or more of the enterprise resources 928 described herein (e.g., a CRM application 929, an ERP application 930). For example, a user of the enterprise resource 928 may provide log-in credentials associated with an enterprise, to access the corresponding enterprise resource 928. In some embodiments, the enterprise resource 928 may be a standalone application. In some embodiments, the enterprise resource 928 may be incorporated into one or more existing applications of the user device 934. The enterprise resource 928 may be downloaded by the user device 934 prior to its usage, hard coded in the user device 934, and/or be a network-based or web-based interface application. In this regard, the ICS controller 904 may provide content and data (e.g., relating to the ICS 900 products or services) to the enterprise resource 928 via the network 924, for displaying at the user device 934. The enterprise resource 928 may receive the content and data (e.g., directly from the ICS controller 904, or indirectly from the ICS controller 904), and the user device 934 may process and display the content and data remotely to the user through the enterprise resource 928 displayed at the user device 934.

The user device 934 is configured to interact with one or more user interfaces described below. For example, the user interfaces that includes an alert may be provided to the user device 934 (e.g., from the ICS 900) for display. However, according to other embodiments, the user interfaces are generated by the user device 934. For example, the ICS 900 may provide some or all of the data required to generate a user interface and the user interface may be locally generated on the user device 934.

Further, the user device 934 may provide inputs to the ICS 900. For example, a user of the user device 934 may interact with a user interface on the user device 934, which may in turn send an update to the ICS 900. For example, the user may enter an event associated with one of the entities within a user interface displayed on the user device 934, which may cause an update to be sent to the ICS 900 such that the ICS 900 updates the alert in response.

In some embodiments, the user device 934 may prompt the user 932 to log onto or access a web-based interface before using the enterprise resource 928. Further, prior to use of the enterprise resource 928, and/or at various points throughout the use of the enterprise resource 928, the user device 934 may prompt the user 932 to provide various authentication information or log-in credentials (e.g., password, a personal identification number (PIN), a fingerprint scan, a retinal scan, a voice sample, a face scan, any other type of biometric security scan) to ensure that the user 932 associated with the user device 934 is authorized to use the enterprise resource 928 and/or permit the ICS to access the ERP data.

In an exemplary embodiment, an enterprise resource 928 accessed via the user device 934 may be configured to transmit, send, receive, communicate, or otherwise exchange data with the ICS 900. For example, an ERP application 930 (e.g., or CRM application 929) may have an option for viewing account information relating to accounts with the ICS 900. The user 932 of the user device 934 (e.g., a registered user having an account with the institution corresponding to the ICS 900) may select the option on the ERP application 930 to view the account information of the user 932 within the ERP application 930. The ERP application 930 may activate an API protocol (e.g., via an API call) to request the information from the ICS controller 904 corresponding to the account information. The ERP application 930 may communicate the API call to the ICS controller 904 via the network 924 and the communications interface 920. The ICS controller 904 (e.g., the API gateway circuit 938) may receive, process, and respond to the API call to provide API response data. For example, responsive to the ERP application 930 (or ICS controller 904) authenticating the user 932 as described herein, the ERP application 930 may transmit data corresponding to the user (e.g., a user identifier) with the API call to the ICS controller 904. The ICS controller 904 may perform a look-up function in an accounts database using the user identifier from the API call to generate the API response data including the enterprise account data 940. The API response data may be communicated to the ERP application 930 via the communications interface and the network 924. In some embodiments, the ERP application 930 may display the response data to the user 932 (e.g., via the ERP application(s) 930), such as the enterprise account data 940.

Similarly, the user device 934 may communicate with the ICS 900, via the network 924, requesting enterprise resource 928 data (e.g., data from a CRM application 929, data from an ERP application 930, etc.) to view on a page associated with the ICS 900. For example, the user device 934 may display a page or user interface corresponding to the ICS 900 that includes an option for viewing analytics on conversion of leads to sales from the CRM application 929. The user device 934 may receive a selection of the option, and initiate a request for the ICS 900 to request the customer information from the CRM application 929. The ICS 900 (e.g., the ICS controller 904 via the communications interface 920) may process the request from the user device 934 (e.g., as discussed herein), and activate an API protocol (e.g., via an API call) associated with the request (i.e., and the CRM application 929, etc.). The API call may be communicated to the CRM application 929 via the network. The CRM application 929 may receive, process, and respond to the API call by providing API response data as described herein. The API response data may be communicated to the ICS 900 (e.g., the ICS controller 904 via the network and the communications interface 920). In some embodiments, a webpage or website (or application) associated with the ICS 900 may display the CRM data received from the CRM application 929 along with ICS data (e.g., account data, balances, etc.).

Referring now to FIG. 10, a flowchart of a method 1000 a method for generating an alert for rendering at a user interface is shown, according to an example embodiment. The method 1000 is configured to receive or retrieve alerts from the ML engine 926 and generate a corresponding alert for rendering at a user interface.

The method 1000 may be performed by leveraging data generated by a Customer Relationship Management (CRM) application being utilized by a user (e.g., a customer), an Enterprise Resource Planning (ERP) application utilized by the user, and/or financial institution data generated by a financial institution supporting the user, to automatically determine a list of entities (e.g., vendors, suppliers, customers, etc.) that transact with user of the enterprise resources 928. Accordingly, training the machine learning model (e.g., the ML engine 926) using historic enterprise resource data and data from third party resources 942 holistically, the machine learning model may detect or otherwise predict events that may impact the entities ability to continue to provide goods or services to the user of the enterprise resources 928 and provide one or more recommendations in response to detecting the event. The method may be performed by one or more components of the systems described herein. It should be appreciated that the method 1000 does not need to be performed in the order shown. Further, various steps may be omitted and additional steps may be included in the method 1000.

At step 1010, a connection is established between a first computing system and an application hosted on a second computing system. According to various embodiments, the connection is associated with an entity (e.g., a business, an individual, etc.) having one or more first accounts with the first computing system (e.g., a financial computing system) and a second account with the application of the second computing system (e.g., an enterprise computing system). The first account may be a financial account (e.g., savings account, credit account, checking account, etc.) with a financial institution. The second account may be associated with an any of the applications discussed herein (e.g., a CRM application, an ERP application, etc.). For example, an ICS controller may be configured to establish a connection between the ERP application and institution application corresponding to the ICS, as is discussed further herein.

In an example embodiment, the first account (e.g., associated with the first server) and the second account (e.g., associated with the second server) are linked to a common account holder (e.g., a user, entity, etc. having, applying, utilizing, etc. one or more accounts via the first application and the second application). The first account and/or the second account may be associated with any of the applications discussed herein. For example, the first account and/or second account may be associated with an institution application (e.g., of the ICS 100), the CRM application 129 (e.g., applications for establishing leads on new customers, assisting in converting a lead to a sale, planning delivery, and so forth), the ERP application 130 (e.g., HR or payroll applications, marketing applications, customer service applications, operations/project/supply chain management applications, commerce design applications, and the like), and/or any other suitable application. According to an exemplary embodiment, the first account is associated with a financial institution application (e.g., of the ICS 100, etc.), and the second account is associated with at least one of the ERP application 130 or the CRM application 129. As discussed herein, the first account and/or the second account may be implemented on, or otherwise hosted on, any suitable computing system or device (e.g., the ICS 100, the user device 134, a discrete server, a group of two or more computing devices/servers, a distributed computing network, a cloud computing network, and/or another type of computing system capable of accessing and communicating using local and/or global network, etc.).

At step 1020, a dataset including a list of entities is retrieved via the connection from the application. For example, the dataset may be received by the machine learning model (e.g., a first machine learning model) from at least one of the ERP application 130 or the CRM application 129. The dataset may include a plurality of data entries corresponding to respective entities (e.g., vendors, suppliers, customers, etc.), each data entry of the plurality of data entries comprising at least one identifier associated with the entity (e.g., a name of the entity, a stock ticker associated with the entity, a name of one of the employees of the entity, an industry the entity is involved in, a location the entity is present or conducts business, etc.).

At least a portion of the dataset retrieved at step 1020 may be received from the first application associated with the first computing system. The first application retrieves at least a portion of data associated with the common account holder, according to an exemplary embodiment. In an exemplary embodiment, the portion of data is accessible via the second application associated with the second computing system. More specifically, the first application (e.g., the ERP application 130, the CRM application 129, etc.) may receive the one or more API calls, and/or the additional data, via an API gateway circuit. The API gateway circuit may be configured to receive the one or more API calls, identify at least one of a plurality of circuits that is best configured to process the API call, and/or route the one or more API calls to the identified API circuit or circuits. The identified circuit (or circuits) may receive and/or process the API call, and provide output data (e.g., API response data) associated with the API call and/or the associated account holder. For example, the output data (e.g., API response data) may include the list of entities and one or more identifiers associated with each entity included in the list of entities. In some embodiments, the output data (e.g., API response data) includes a portion of the additional data received from the second application, and/or data associated with the second application stored at the first application (e.g., account aggregation information, account balance information, transaction detail information, account information, validation information, lending or loan information, foreign exchange information, payment initiation information, payment initiation requests, confirmation of funds information, and/or any other suitable information associated with the second application, etc.).

At step 1030, an event associated with an entity of the list of entities is detected based on third party data. For example, a first machine learning model configured to detect an event associated with an entity of the list of entities (e.g., via data from a third party resource 942) may detect an event based on third party data and output an alert in response to detecting the event, wherein the alert is displayable within a user interface. For example, the first machine learning model may receive a dataset including a list of entities associated with an account holder of an account with the ERP application (e.g., pulled via API calls from the ERP application).

In general, the first machine learning model may use the initial inputs to predict or identify events associated with one or more of the entities included in the list of entities, such as an bankruptcy, a merger, an acquisition, a supply chain interruption, sanctions, and/or any other event that may impact the entities ability to provide goods or services to the enterprise.

The first machine learning model may access or otherwise receive data from one or more third party resources 942 related to one or more of the entities of the list of entities. For example, the first ML model may leverage a third party search engine, one or more crawlers, one or more scrapers, and/or one or more spiders to gather or otherwise access various datasets that include data corresponding with one or more of the entities of the list of entities. The ML model may utilize various third party resources 942, including, but not limited to, third party news outlets, financial statements (e.g., 8-k filing, 10-k filing, 10-Q filing, etc.), online blogs, social media channels, etc.).

Additionally, the first ML model may access one or more invoice datasets (e.g., invoice datasets) from the ERP resources corresponding with entities. According to various embodiments, each invoice dataset includes a plurality of data entries corresponding to respective invoices. Each data entry of the plurality of data entries may define an amount, due date, and one or more trade terms associated with payment of the invoice. The invoice datasets may provide the first machine learning model with insight into outstanding debt and/or accounts receivable associated with the entity, which may not otherwise be publicly available. According to various embodiments, the invoice data (e.g., invoice datasets) is pulled via API calls from the ERP application 930 as described further herein.

As a part of step 1030, the first machine learning model may normalize the data received from the various third party resources 942. Normalizing the data may include normalizing the values (e.g., metrics) of the data (e.g., scaling the data from 1-100), normalizing the terms used in the data, normalizing the lineage, normalizing the data types, and the like. For example, the first machine learning model may normalize the data using one hot encoding.

After normalization, the first machine learning model evaluates the normalized dataset. The first machine learning model may determine that one or more normalized metrics satisfy a criterion for identifying the presence of an event (e.g., missing earnings by an amount larger than an earnings threshold, a net loss greater than a net loss threshold, etc.). For example, the first machine learning model may scrape the data from the third-party server (e.g., a first third-party server) to identify one or more identifies of the entity included in the data (e.g., a name of the entity, a stock ticker associated with the entity, a name of one of the employees of the entity, an industry the entity is involved in, a location the entity is present or conducts business, etc.). The first machine learning model may then generate a query for a second third-party server using the one or more identifiers. For example, the first machine learning model may verify the entity identified in the data from the first third-party server as matching the entity in the list of entities in the dataset base on a response to the query from the second third-party server. The first machine learning model may normalize the metrics from the first and second third-party servers and determine if the normalized metrics satisfy a criterion (e.g., are above or below a minimum threshold) for identifying the presence of the event. In response to satisfying the criterion, may determine an event associated with the entity responsive to one or more metrics satisfying the criterion.

The first machine learning model may determine a severity score (e.g., a first score) for the event. The severity score may be indicative of the severity of the event. For example, an event that is expected to significantly impact the entities ability to provide goods to the customer may have a higher severity score than an event that is may not significantly impact the entities ability to provide goods to the customer. According to various embodiments, an alert is only generated in response to the severity score being greater than a first threshold. For example, if an event is detected and the first machine learning model determines the event will not significantly impact the entities ability to transact with the user, the first machine learning model may compute a severity score that is below the first threshold such that an event is not detected and/or an alert is not be generated and provided to the user.

Further, the first machine learning model may generate a match score (e.g., a second score) associated with the event. For example, the match score may be computed based on the first machine learning model's confidence that the data (e.g., identifiers) received from the third party resources 942 corresponds with one or more of the entities included in the list of entities. For example, the match score may be based on the one or more identifiers (e.g., a name of the entity, a stock ticker associated with the entity, a name of one of the employees of the entity, an industry the entity is involved in, a location the entity is present or conducts business, etc.) being associated with the entity from the list of entities included in the dataset. In an example embodiment, if the machine learning model can match a plurality of identifiers from the third party resources 942 to a plurality of identifiers included in the list of entities, a relatively high match score may be generated. However, if only a single identifier from the third party resource 942 is matched to an identifier included in the list of entities, a relatively low match score may be generated. According to various embodiments, an alert is only generated in response to the match score being greater than a second threshold. For example, if an event is detected and the first machine learning model determines a match score that is below the second threshold, an event may not be detected and/or an alert may not be generated and provided to the user. Such implementations may provide for a reduced likelihood of misinformation/confusion of an alert by a non-matching entity, by ensuring that the match score satisfies the second threshold.

Further, the first machine learning model may generate a confidence score (e.g., a third score) associated with the event. Further, the confidence score determined in response to an entity filing for bankruptcy may be higher than an unverified blog post that claims the entity may be filing for bankruptcy. Further, the entity identified in the data from the first third-party server as matching the entity in the list of entities in the dataset base on a response to the query from the second third-party server may result in an increased confidence score. According to various embodiments, an alert is only generated in response to the confidence score being greater than a third threshold. For example, if an event is detected and the first machine learning model determines a confidence score that is below the third threshold, an event may not be detected and/or an alert may not be generated and provided to the user.

According to various embodiments, an event may be detected only in response to two or more scores being higher than a first threshold or one or more criteria being satisfied. For example, the first machine learning model may detect an event in response to the match score satisfying a threshold criteria and the normalized one or more metrics satisfying the criterion. In another example embodiment, the event is detected only in response the match score satisfying a threshold criteria, the confidence score being greater than a threshold criteria, a severity score being greater than a threshold criteria, one or more metrics (e.g., normalized metrics) satisfying a criterion, or any combination thereof.

At step 1040, an alert corresponding to the event is generated, wherein the alert is configured for rendering at a user interface corresponding with the first computing system. For example, the alert may be displayed on a device accessible by a user associated with the customer of the enterprise resources.

According to various embodiments, step 1040 includes applying the event to a second machine learning model trained to generate recommendations given one or more events as an input. For example, according to various embodiments, the alert includes a recommendation for the determined event. For example, a second machine learning model may be trained to generate recommendations given one or more events as an input. For example, the first ML model may identify an event and provide the event, along with a match score, a confidence score, a severity score and/or one or more normalized metrics, to a second machine learning model, which may determine a recommendation based on the input. For example, the second machine learning model may identify alternative good or service providers that are capable of providing comparable goods or services in response to detecting an event. The second machine learning model may further provide a recommendation in accordance with any of the other examples described herein. For example, if the first machine learning model detects a bankruptcy event that may prevent a customer of the user from remitting payment for an invoice in due course, the second machine learning model may recommend taking out a loan to ensure the user has sufficient funds available to continue doing business.

Figure 11:
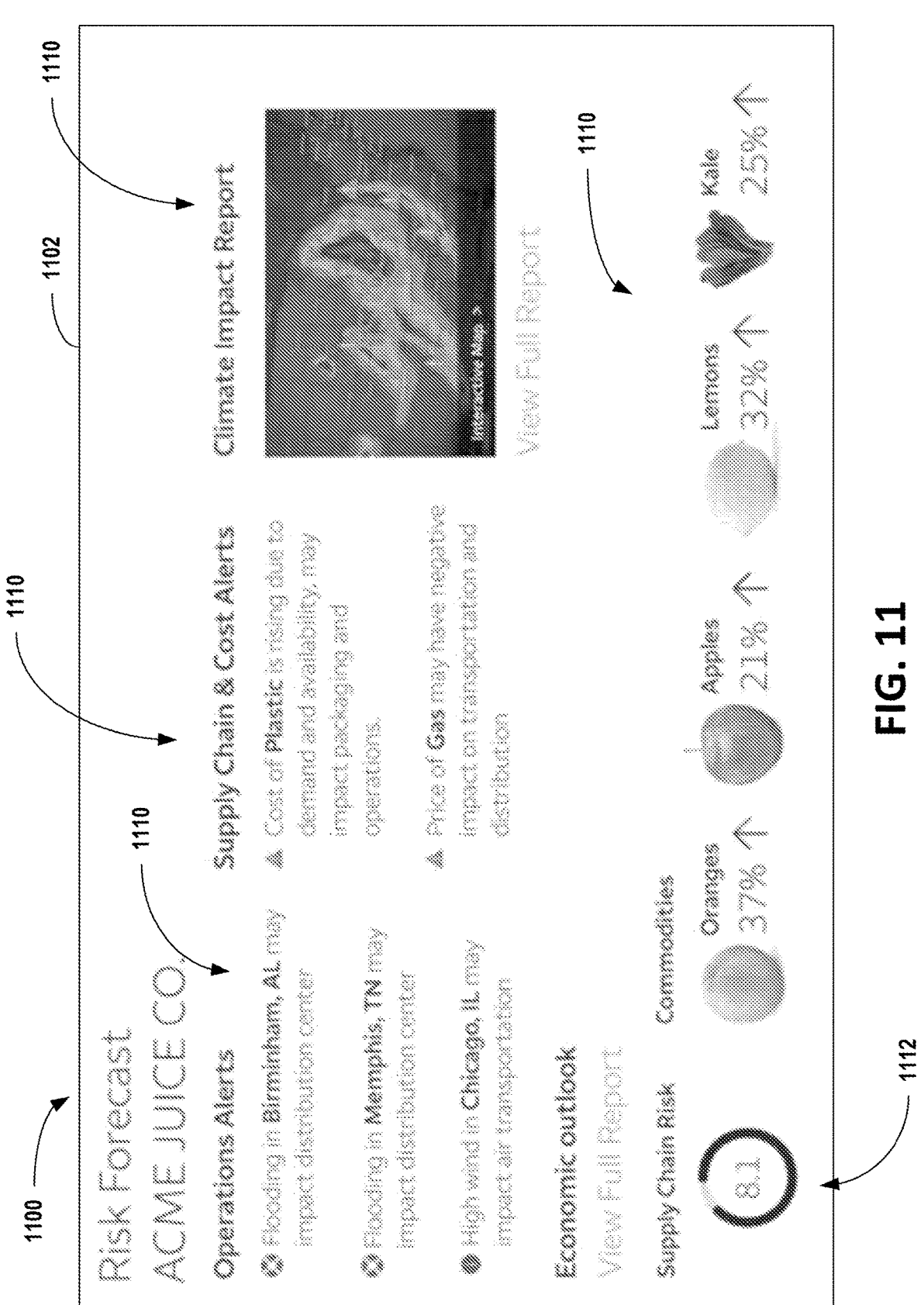
FIG. 11 is an alert rendered at a user interface, according to an example embodiment.

Referring now to FIG. 11, an alert 1100 rendered at a user interface 1102 is shown, according to an example embodiment. As shown, the alert 1100 includes a plurality of events 1110 that were detected (e.g., as a part of step 1030). In the shown example, the events 1110 include operations alerts, supply chain and cost alerts, climate impact reports, and commodity pricing alerts. According to various embodiments, the events 1110 may be detected based on data received from the enterprise resources 950, the third party resources 942, and/or any other data source described herein.

As shown, the alert 1100 further includes a risk metric 1112. The risk metric 1112 may be determined by the ICS (e.g., the ML Engine 926). The risk metric 1112 may be determined based on data from the enterprise resource 950, the third-party resource 942, or a combination thereof.

Figure 12:
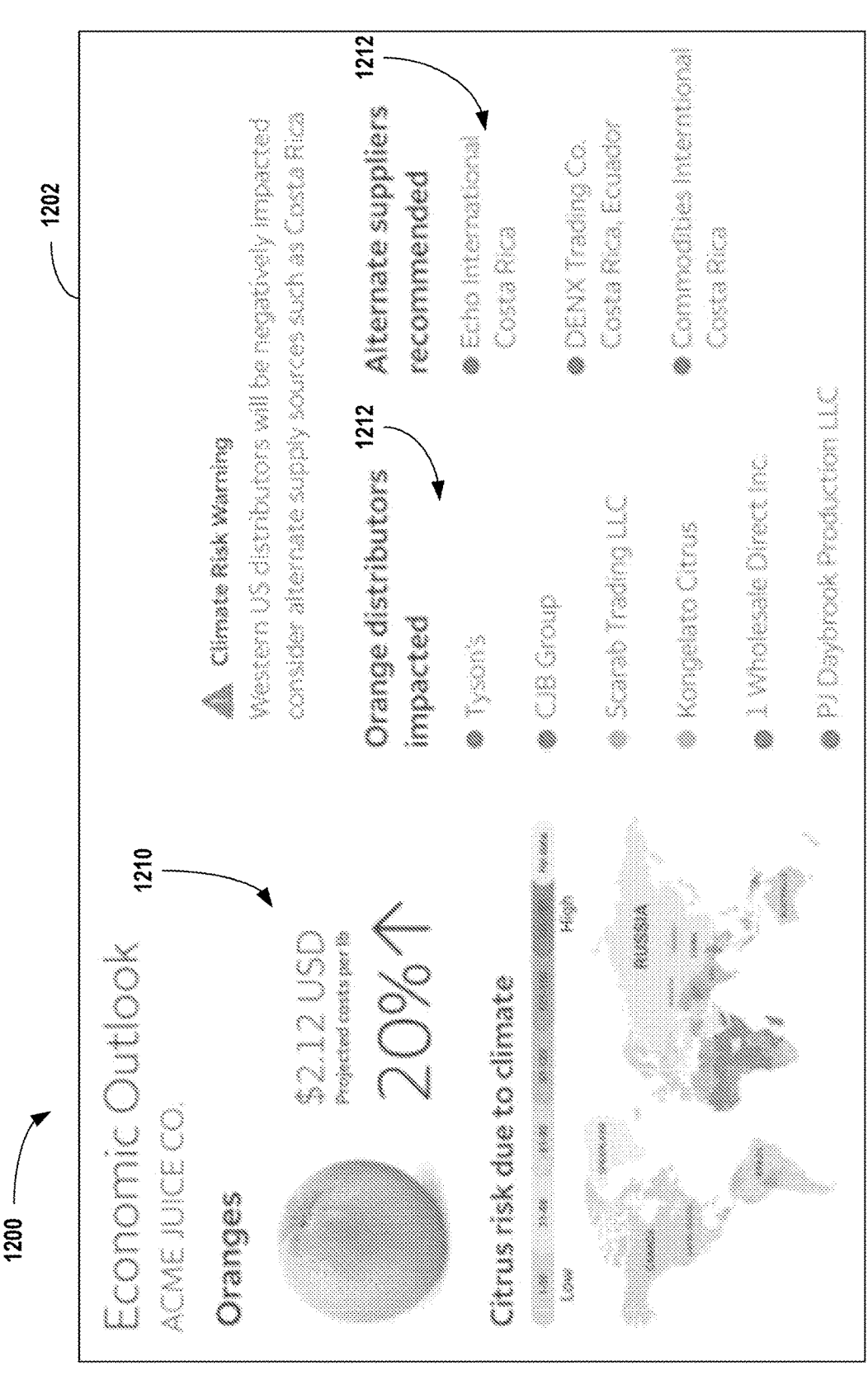
FIG. 12 is another alert rendered at user interface, according to an example embodiment.

Referring now to FIG. 12, another alert 1200 rendered at a user interface 1202 is shown, according to an example embodiment. As shown, the alert 1200 includes a plurality of events 1210 that were detected (e.g., as a part of step 1030). According to various embodiments, the events 1210 may be detected based on data received from the enterprise resources 950, the third part resources 942, and/or any other data source described herein.

Additionally, the alert 1200 includes a list of parties 1212 that may be impacted by the detected event 1210. The list of parties 1212 may be received as a part of step 1020 described above. The list of parties 1212 may be determined based on data received from the enterprise resources 950, the third part resources 942, and/or any other data source described herein. For example, one or more of the listed parties 1212 may be associated with an account holder of an account with one or more of the enterprise resource 950 applications described herein. Additionally, one or more of the listed parties 1212 may be determined based on third party data from a third party resource 942.

Further, the alert 1200 includes a list of recommendations 1212 (e.g., alternate suppliers recommended). The list of recommendations may be determined applying an event (e.g., the detected event 1210) to a machine learning model trained to generate recommendations given one or more events as an input. For example, the machine learning model may identify alternative service providers (e.g., the listed suppliers included in the list of recommendations 1212) that are capable of providing comparable goods or services in response to detecting an event. According to various embodiments, the machine learning model may leverage enterprise resource data associated with one or more of the alternate suppliers recommended to determine the list of recommendations 1212. For example, one or more of the alternate suppliers recommended may maintain and an enterprise resource account and the machine learning model may leverage the enterprise resource data associated with the enterprise resource account to determine the listed alternate suppliers are able to provide comparable goods or services in response to detecting an event.

As discussed above, in an example embodiment, the alert is generated only in response the match score satisfying a threshold criteria, the confidence score being greater than a threshold criteria, a severity score being greater than a threshold criteria, one or more metrics (e.g., normalized metrics) satisfying a criterion, or any combination thereof.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include software for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

Accordingly, the "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quadcore processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposedlocally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed:

1. A method comprising:

establishing, by one or more processors of a first computing system, a connection between the first computing system and an application hosted on one or more servers of a second computing system, responsive to receiving a first application program interface (API) call at the first computing system;

retrieving, by the one or more processors, responsive to receiving a second API call at an API gateway circuit, a dataset comprising a list of entities from a data store maintained by the application, the list of entities associated with an account holder of an account with the application, wherein retrieving the dataset comprises:

determining, by the one or more processors, based on information in the second API call, at least one circuit of a plurality of circuits internal to the API gateway circuit configured to process the second API call;

routing, by the one or more processors via the API gateway circuit, the second API call to the at least one circuit; and receiving, by the one or more processors via the at least one circuit, the dataset as API response data;

detecting, by the one or more processors, an event associated with an entity of the list of entities, based on the dataset received as the API response data and data from a third-party server;

generating, by the one or more processors, an alert corresponding to the event for rendering at a user interface corresponding to the first computing system; and responsive to a user interaction with the alert at the user interface, executing, by the one or more processors using the at least one circuit, a transaction with the entity associated with the event.

2. The method of claim 1, wherein detecting the event comprises:

receiving, by the one or more processors, the data from the third-party server;

applying, by the one or more processors, the data to a machine learning model trained to normalize the data, to determine normalized data from the data; and detecting, by the one or more processors, the event based on the normalized data from the machine learning model.

3. The method of claim 2, wherein the machine learning model is a first machine learning model, the method further comprising:

applying, by the one or more processors, the event to a second machine learning model trained to generate recommendations given one or more events as an input; and determining, by the one or more processors, a recommendation for the event associated with the entity based on an output from the second machine learning model.

4. The method of claim 3, wherein the alert includes the recommendation determined for the event.

5. The method of claim 2, wherein the third-party server comprises a first third-party server, and wherein detecting the event based on the normalized data from the machine learning model comprises:

scraping, by the one or more processors, the data from the first third-party server to identify one or more identifiers of the entity included in the data;

generating, by the one or more processors, a query for a second third-party server using the one or more identifiers; and verifying, by the one or more processors, the entity identified in the data from the first third-party server as matching the entity in the list of entities in the dataset base on a response to the query from the second third-party server.

6. The method of claim 5, wherein generating the alert is responsive to verifying the entity as matching the entity in the list of entities.

7. The method of claim 5, further comprising:

computing, by the one or more processors, a first score for the event and a second score for matching the entity identified in the data to the entity in the list of entities in the dataset, wherein the alert is generated responsive to the first score and the second score satisfying a threshold criteria.

8. The method of claim 1, wherein detecting the event comprises:

receiving, by one or more processors, content from a third party server including one or more identifiers of the entity and one or more metrics corresponding to the event;

normalizing, by the one or more processors, the one or more metrics;

determining, by the one or more processors, that the normalized one or more metrics satisfy a criterion for identifying the presence of the event;

computing, by the one or more processors, a match score based on the one or more identifiers being associated with the entity from the list of entities included in the dataset; and detecting, by the one or more processors, the event associated with the entity responsive to the match score satisfying a threshold criteria and the normalized one or more metrics satisfying the criterion.

9. The method of claim 8, wherein generating the alert comprises:

applying, by the one or more processors, data corresponding to the event and one or more values from fields retrieved from an account with the second computing system to a machine learning model trained to generate recommendations for corresponding events; and generating, by the one or more processors, the alert to include a recommendation corresponding to an alternative entity with respect to the entity.

10. A system comprising:

one or more processors configured to:

establish a connection between a first computing system and an application hosted on one or more servers of a second computing system in response to receiving a first application program interface (API) call at the first computing system;

retrieve, responsive to receiving a second API call at an API gateway circuit, a dataset comprising a list of entities from a data store maintained by the application, the list of entities associated with an account holder of an account with the application, wherein retrieving the dataset comprises:

determine, based on information in the second API call, at least one circuit of a plurality of circuits internal to the API gateway circuit configured to process the second API call;

route, via the API gateway circuit, the second API call to the at least one circuit; and receive, via the at least one circuit, the dataset as API response data;

detect an event associated with an entity of the list of entities, based on the dataset received as the API response data and data from a third-party server;

generate an alert corresponding to the event for rendering at a user interface corresponding to the first computing system; and responsive to a user interaction with the alert at the user interface, execute, using the at least one circuit, a transaction with the entity associated with the event.

11. The system of claim 10, wherein to detect the event, the one or more processors are configured to:

receive the data from the third-party server;

apply the data to a machine learning model trained to normalize the data, to determine normalized data from the data; and detect the event based on the normalized data from the machine learning model.

12. The system of claim 11, wherein the machine learning model is a first machine learning model, wherein the one or more processors are configured to:

apply the event to a second machine learning model trained to generate recommendations given one or more events as an input; and determine a recommendation for the event associated with the entity based on an output from the second machine learning model.

13. The system of claim 12, wherein the alert includes the recommendation determined for the event.

14. The system of claim 11, wherein the third-party server comprises a first third-party server, and wherein detecting the event based on the normalized data from the machine learning model comprises:

scraping, by the one or more processors, the data from the first third-party server to identify one or more identifiers of the entity included in the data;

generating, by the one or more processors, a query for a second third-party server using the one or more identifiers; and verifying, by the one or more processors, the entity identified in the data from the first third-party server as matching the entity in the list of entities in the dataset base on a response to the query from the second third-party server.

15. The system of claim 14, wherein the one or more processors generate the alert is responsive to verifying the entity as matching the entity in the list of entities.

16. The system of claim 14, wherein the one or more processors are configured to:

compute a first score for the event and a second score for matching the entity identified in the data to the entity in the list of entities in the dataset, wherein the alert is generated responsive to the first score and the second score satisfying a threshold criteria.

17. The system of claim 10, wherein to detect the event, the one or more processors are configured to:

receive content from a third party server including one or more identifiers of the entity and one or more metrics corresponding to the event;

normalize the one or more metrics;

determine that the normalized one or more metrics satisfy a criterion for identifying the presence of the event;

compute a match score based on the one or more identifiers being associated with the entity from the list of entities included in the dataset; and detect the event associated with the entity responsive to the match score satisfying a threshold criteria and the normalized one or more metrics satisfying the criterion.

18. The system of claim 17, wherein to generate the alert, the one or more processors are configured to:

apply data corresponding to the event and one or more values from fields retrieved from an account with the second computing system to a machine learning model trained to generate recommendations for corresponding events; and generate the alert to include a recommendation corresponding to an alternative entity with respect to the entity.

19. A non-transitory computer readable medium storing instructions that, when executed by one or more processors, cause the one or more processors to:

establish a connection between a first computing system and an application hosted on one or more servers of a second computing system in response to receiving a first application program interface (API) call at the first computing system;

retrieve, responsive to receiving a second API call at an API gateway circuit, a dataset comprising a list of entities from a data store maintained by the application, the list of entities associated with an account holder of an account with the application, wherein retrieving the dataset comprises:

determine, based on information in the second API call, at least one circuit of a plurality of circuits internal to the API gateway circuit configured to process the second API call;

route, via the API gateway circuit, the second API call to the at least one circuit; and receive, via the at least one circuit, the dataset as API response data;

detect an event associated with an entity of the list of entities, based on the dataset received as the API response data and data from a third-party server;

generate an alert corresponding to the event for rendering at a user interface corresponding to the first computing system; and responsive to a user interaction with the alert at the user interface, execute, using the at least one circuit, a transaction with the entity associated with the event.

20. The non-transitory computer readable medium of claim 19, wherein to detect the event, the instructions cause the one or more processors to:

receive content from a third party server including one or more identifiers of the entity and one or more metrics corresponding to the event;

normalize the one or more metrics;

determine that the normalized one or more metrics satisfy a criterion for identifying the presence of the event;

compute a match score based on the one or more identifiers being associated with the entity from the list of entities included in the dataset; and detect the event associated with the entity responsive to the match score satisfying a threshold criteria and the normalized one or more metrics satisfying the criterion.

* * * * *